United States Patent
Obayashi et al.

(10) Patent No.: US 12,415,502 B2
(45) Date of Patent: Sep. 16, 2025

(54) METHOD OF CONTROLLING VEHICLE AND HYBRID VEHICLE

(71) Applicant: KAWASAKI MOTORS, LTD., Akashi (JP)

(72) Inventors: Kosuke Obayashi, Kobe (JP); Tomoki Tada, Akashi (JP); Mengqing Liu, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 82 days.

(21) Appl. No.: 18/607,273

(22) Filed: Mar. 15, 2024

(65) Prior Publication Data
US 2024/0359681 A1 Oct. 31, 2024

(30) Foreign Application Priority Data
Apr. 25, 2023 (JP) .................. 2023-071656

(51) Int. Cl.
*B60W 20/40* (2016.01)
*B60W 30/182* (2020.01)
(Continued)

(52) U.S. Cl.
CPC .......... *B60W 20/40* (2013.01); *B60W 30/182* (2013.01); *B60W 50/0205* (2013.01);
(Continued)

(58) Field of Classification Search
CPC ............... B60W 20/40; B60W 30/182; B60W 50/0205; B60W 50/029; B60W 50/082;
(Continued)

(56) References Cited

U.S. PATENT DOCUMENTS

| 5,550,445 A | 8/1996 | Nii |
| 2013/0066525 A1* | 3/2013 | Tomik .................. B60R 25/24 |
| | | 701/45 |

(Continued)

FOREIGN PATENT DOCUMENTS

| DE | 102019121444 A1 | 2/2021 |
| JP | H07095703 A | 4/1995 |

*Primary Examiner* — Jason Holloway
*Assistant Examiner* — Madison B Emmett
(74) *Attorney, Agent, or Firm* — Alleman Hall & Tuttle LLP

(57) ABSTRACT

A vehicle includes: a driving wheel; at least one prime mover; a user interface that receives user's selection of a first traveling mode or a second traveling mode; and processing circuitry configured to control the prime mover in accordance with the selected traveling mode. When a selection disabling condition indicating a predetermined vehicle state is satisfied, the processing circuitry disables selection of the first traveling mode which is performed by the user's selection. When the selection disabling condition is satisfied while the vehicle is traveling in the first traveling mode, the processing circuitry continues the first traveling mode until a switching condition indicating a predetermined vehicle state is satisfied. When the selection disabling condition is satisfied while the vehicle is traveling in the first traveling mode, and the switching condition is satisfied, the processing circuitry switches the traveling mode to the second traveling mode regardless of the user's selection.

13 Claims, 10 Drawing Sheets

(51) Int. Cl.
*B60W 50/02* (2012.01)
*B60W 50/029* (2012.01)
*B60W 50/08* (2020.01)
*B60W 50/14* (2020.01)

(52) U.S. Cl.
CPC ........ *B60W 50/029* (2013.01); *B60W 50/082* (2013.01); *B60W 50/14* (2013.01); *B60W 2050/146* (2013.01); *B60W 2300/36* (2013.01); *B60W 2510/244* (2013.01); *B60W 2540/215* (2020.02); *B60W 2556/10* (2020.02)

(58) Field of Classification Search
CPC ........... B60W 50/14; B60W 2050/146; B60W 2300/36; B60W 2510/244; B60W 2540/215; B60W 2556/10; B60W 20/50; B60W 10/06; B60W 10/08; B60W 20/10; B60K 2006/4825; B60K 6/48
See application file for complete search history.

(56) References Cited

U.S. PATENT DOCUMENTS

| | | | |
|---|---|---|---|
| 2013/0173098 A1* | 7/2013 | Takagi | B60W 10/06 701/22 |
| 2014/0114512 A1* | 4/2014 | Treharne | B60W 10/06 180/65.23 |
| 2018/0170350 A1* | 6/2018 | Aoki | B60K 6/445 |
| 2020/0180599 A1* | 6/2020 | Kang | B60K 6/22 |
| 2020/0398844 A1* | 12/2020 | Ruybal | B60W 10/08 |
| 2021/0281101 A1* | 9/2021 | Lee | B60W 20/13 |
| 2022/0105793 A1* | 4/2022 | Sukhatankar | B60W 30/19 |
| 2022/0316585 A1* | 10/2022 | Bartels | F16H 61/0213 |
| 2023/0103009 A1* | 3/2023 | Jeoung | B60W 40/08 701/79 |
| 2023/0166717 A1* | 6/2023 | Hancock | B60W 20/13 701/22 |

* cited by examiner

METHOD OF CONTROLLING VEHICLE AND HYBRID VEHICLE

CROSS-REFERENCE TO RELATED APPLICATIONS

This application claims priority to and the benefit of Japanese Patent Application No. 2023-71656 filed on Apr. 25, 2023, the entire disclosure of which is incorporated herein by reference.

BACKGROUND OF THE INVENTION

Field of the Invention

The present disclosure relates to a method of controlling a vehicle and a hybrid vehicle each of which sets a traveling mode corresponding to the situation.

Description of the Related Art

Japanese Laid-Open Patent Application Publication No. 7-95703 discloses that in a hybrid vehicle including driving wheels driven by both of an engine and a motor, when a remaining amount of electric power of a battery decreases, output generated by the driving of the motor is limited.

However, there is a possibility that a driver feels uneasy with driving feeling due to output variation during traveling by the limitation of the output generated by the driving of the motor.

SUMMARY OF THE INVENTION

An object of the present disclosure is to provide a vehicle that can suppress deterioration of driving feeling due to output variation.

A vehicle according to the present disclosure includes: a driving wheel; at least one prime mover that generates driving power to be transmitted to the driving wheel; a user interface that receives user's selection of a first traveling mode or a second traveling mode; and processing circuitry configured to control the prime mover in accordance with the selected traveling mode. When a selection disabling condition indicating a predetermined vehicle state is satisfied, the processing circuitry disables selection of the first traveling mode which is performed by the user's selection. When the selection disabling condition is not satisfied, the processing circuitry enables the selection of the first traveling mode which is performed by the user's selection. When the selection disabling condition is satisfied while the vehicle is traveling in the first traveling mode, the processing circuitry continues the first traveling mode until a switching condition indicating a predetermined vehicle state is satisfied. When the selection disabling condition is satisfied while the vehicle is traveling in the first traveling mode, and the switching condition is satisfied, the processing circuitry switches the traveling mode to the second traveling mode regardless of the user's selection.

Moreover, a method of controlling a hybrid vehicle according to the present disclosure is a method of controlling a hybrid vehicle including first and second prime movers that generate driving power to be transmitted to a driving wheel. The method includes: controlling the first and second prime movers in accordance with a traveling mode that is one of a first traveling mode that mainly uses the first prime mover and a second traveling mode that mainly uses the second prime mover; when a selection disabling condition indicating a predetermined vehicle state is satisfied, disabling selection of the first traveling mode which is performed by user's selection; when the selection disabling condition is not satisfied, enabling the selection of the first traveling mode which is performed by the user's selection; when the selection disabling condition is satisfied while the vehicle is traveling in the first traveling mode, continuing the first traveling mode; and when the selection disabling condition is satisfied while the vehicle is traveling in the first traveling mode, and a switching condition indicating a predetermined vehicle state is satisfied, switching the traveling mode to the second traveling mode regardless of the user's selection.

Furthermore, a vehicle according to the present disclosure includes: a driving wheel; at least one prime mover that generates driving power to be transmitted to the driving wheel; a user interface that receives user's selection of a first traveling mode or a second traveling mode; and processing circuitry configured to control the prime mover in accordance with the selected traveling mode. When an abnormality condition indicating a predetermined vehicle state is satisfied while the vehicle is traveling in the first traveling mode, the processing circuitry continues the first traveling mode until a switching condition indicating a predetermined vehicle state is satisfied. When the abnormality condition is satisfied while the vehicle is traveling in the first traveling mode, and the switching condition is satisfied, the processing circuitry switches the traveling mode to the second traveling mode regardless of the user's selection. The second traveling mode is a traveling mode in which the satisfaction of the abnormality condition is avoidable.

According to the present disclosure, when the selection disabling condition is satisfied, the selection of the first traveling mode is disabled. Therefore, the influence of the excessive increase of the number of opportunities of the traveling in the first traveling mode is suppressed. Moreover, until the switching condition is satisfied, the traveling mode is not switched to the second traveling mode. Therefore, the deterioration of the driving feeling by the unintentional switching of the traveling mode is suppressed.

The above object, other objects, features, and advantages of the present disclosure will be made clear by the following detailed explanation of preferred embodiments with reference to the attached drawings.

DETAILED DESCRIPTION

Figure 1:
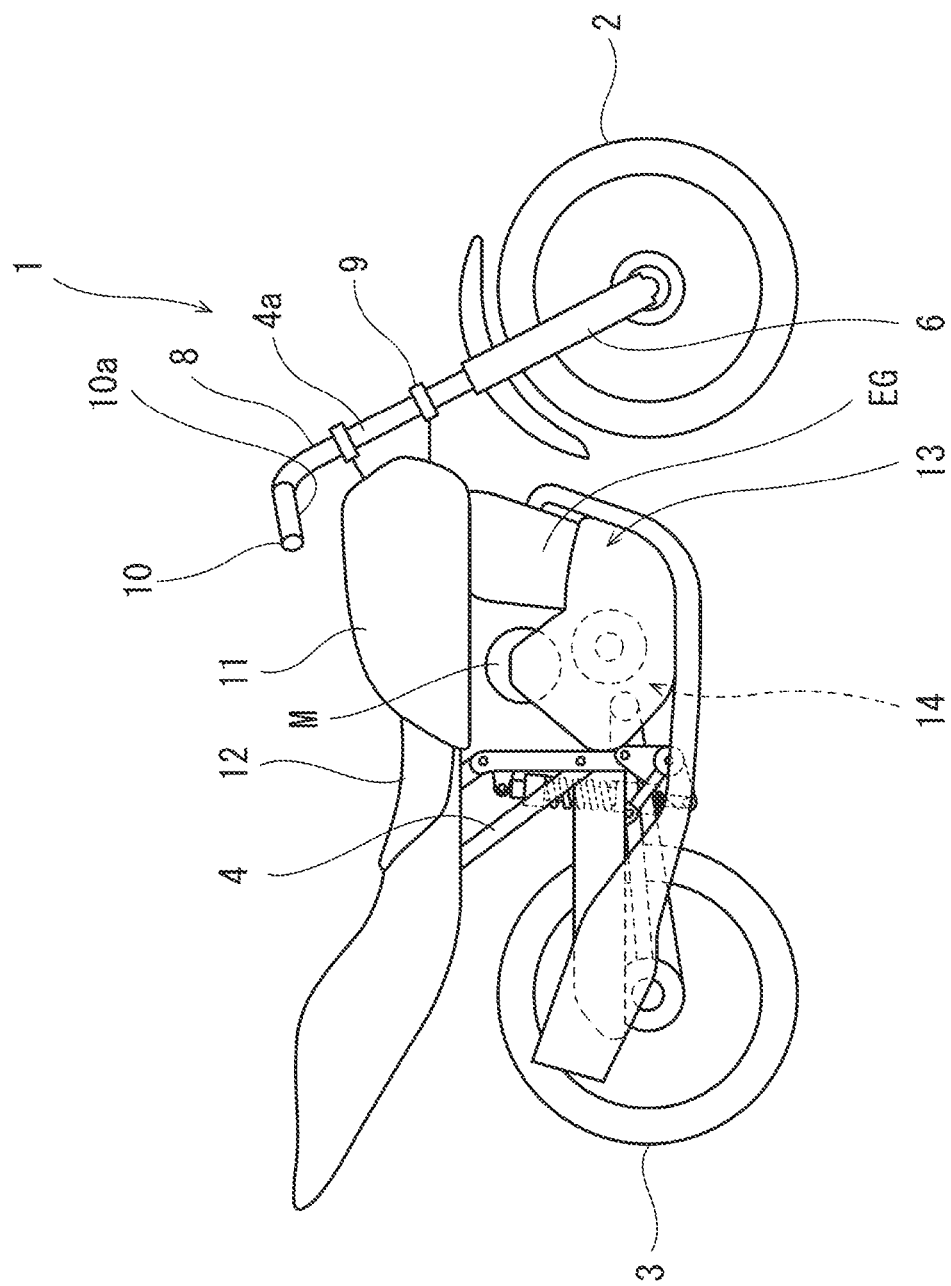
FIG. 1 is a side view of a vehicle according to an embodiment.

Hereinafter, a method of controlling a vehicle and a hybrid vehicle according to an embodiment will be described with reference to the drawings. FIG. 1 is a side view of a vehicle 1 according to the embodiment. As shown in FIG. 1, in the present embodiment, the vehicle 1 is one example of a straddled vehicle straddled by a rider. In the present embodiment, the vehicle 1 is a motorcycle that is a hybrid vehicle.

The vehicle 1 includes a front wheel 2, a rear wheel 3, a vehicle body frame 4, a front suspension 6 connecting the front wheel 2 to a front portion of the vehicle body frame 4, and a rear suspension 7 connecting the rear wheel 3 to a rear portion of the vehicle body frame 4. The front suspension 6 is coupled to a bracket 9 which is located at a lower portion of a steering shaft 8 and is spaced apart from the front suspension 6 in an upper-lower direction. The steering shaft 8 connected to the bracket 9 is supported by a head pipe 4a so as to be angularly displaceable. The head pipe 4a is part of the vehicle body frame 4.

A handlebar 10 held by hands of the rider is located at the steering shaft 8. The handlebar 10 includes an accelerator manipulation element 10a that is operated to adjust acceleration and deceleration of the vehicle 1. A fuel tank 11 is located behind the handlebar 10. A seat 12 on which the rider is seated is located behind the fuel tank 11. A power unit 13 that is a traveling driving source is mounted on the vehicle body frame 4 so as to be located between the front wheel 2 and the rear wheel 3.

The power unit 13 includes: an engine EG (second prime mover) that is an internal combustion engine as a prime mover; and a drive motor M (first prime mover) that is an electric motor as a prime mover and includes a driving shaft. In the present embodiment, the engine EG and the drive motor M serve as the prime movers that generate rotational driving power to be transmitted to the rear wheel 3. A transmission 14 is located behind the engine EG.

Figure 2:
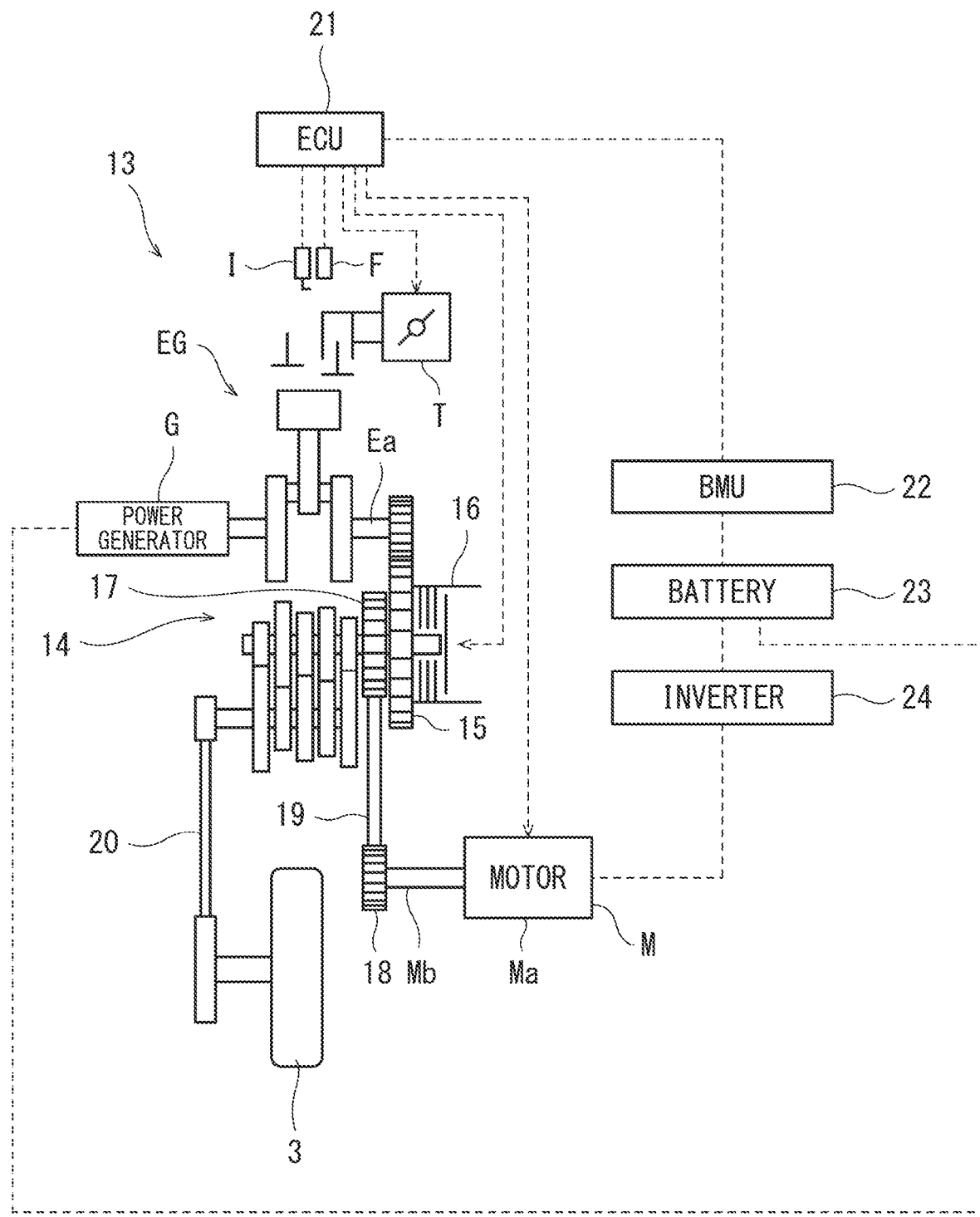
FIG. 2 is a schematic diagram of a power system of the vehicle.

FIG. 2 is a schematic diagram of a power system of the vehicle 1 of FIG. 1. The transmission 14 includes an input shaft, an output shaft, and gear trains having different reduction ratios. The transmission 14 can transmit power from the input shaft to the output shaft through the gear train and changes the speed by selecting any one of the gear trains. For example, the transmission 14 is a dog clutch transmission. One end portion of a crank shaft Ea of the engine EG is connected to a primary gear 15 so as to be able to transmit power to the primary gear 15.

The primary gear 15 is located around an axis of the transmission 14 so as to be rotatable relative to the transmission 14. The primary gear 15 is connected to the transmission 14 through a main clutch 16 so as to be able to transmit power to the transmission 14 through the main clutch 16. The main clutch 16 cuts or establishes a power path extending from the crank shaft Ea to the transmission 14. The main clutch 16 is driven by hydraulic pressure to cut or establish the power path extending from the crank shaft Ea to the transmission 14.

A sprocket 17 is located between the primary gear 15 and the transmission 14. The drive motor M includes a motor housing Ma and a motor drive shaft Mb projecting from the motor housing Ma. A sprocket 18 is located at the motor drive shaft Mb so as to rotate together with the motor drive shaft Mb. Instead of the sprockets 17 and 18, gears or pulleys may be used as rotary members. Then, a chain 19 is connected to the sprocket 17 located at the transmission 14 and the sprocket 18 located at the motor drive shaft Mb. Thus, driving power of the drive motor M is transmitted to the transmission 14 through the sprocket 17. The transmission 14 transmits the driving power to the rear wheel 3 through an output transmitting structure 20 (such as a chain or a belt).

An ECU 21 (processing circuitry) controls the engine EG. Specifically, the ECU 21 controls throttle equipment 40, a fuel injector F, and an igniter I. Moreover, the ECU 21 controls engagement and disengagement of the main clutch 16 as described above to switch whether to transmit the driving of the engine EG to the rear wheel 3 that is a driving wheel. Moreover, the ECU 21 controls the driving of the drive motor M through a BMU (battery management unit) 22, a battery 23, and an inverter 24. The ECU 21 can switch traveling modes among which how to drive the rear wheel 3 that is the driving wheel is different. Specifically, the ECU 21 can switch the traveling mode between a HEV mode in which the rear wheel 3 is driven by the engine EG and an EV mode in which the rear wheel 3 is driven by the drive motor M.

In the present embodiment, the drive motor M may serve as a power generator. When the driving power of the engine EG is used, the drive motor M generates electric power, and the generated electric power can be stored in the battery 23. Moreover, in addition to the drive motor M, a power generator G is located. The power generator G receives the rotational power of the crank shaft Ea to generate electric power. The electric power generated by the power generator G is stored in the battery 23.

Figure 3:
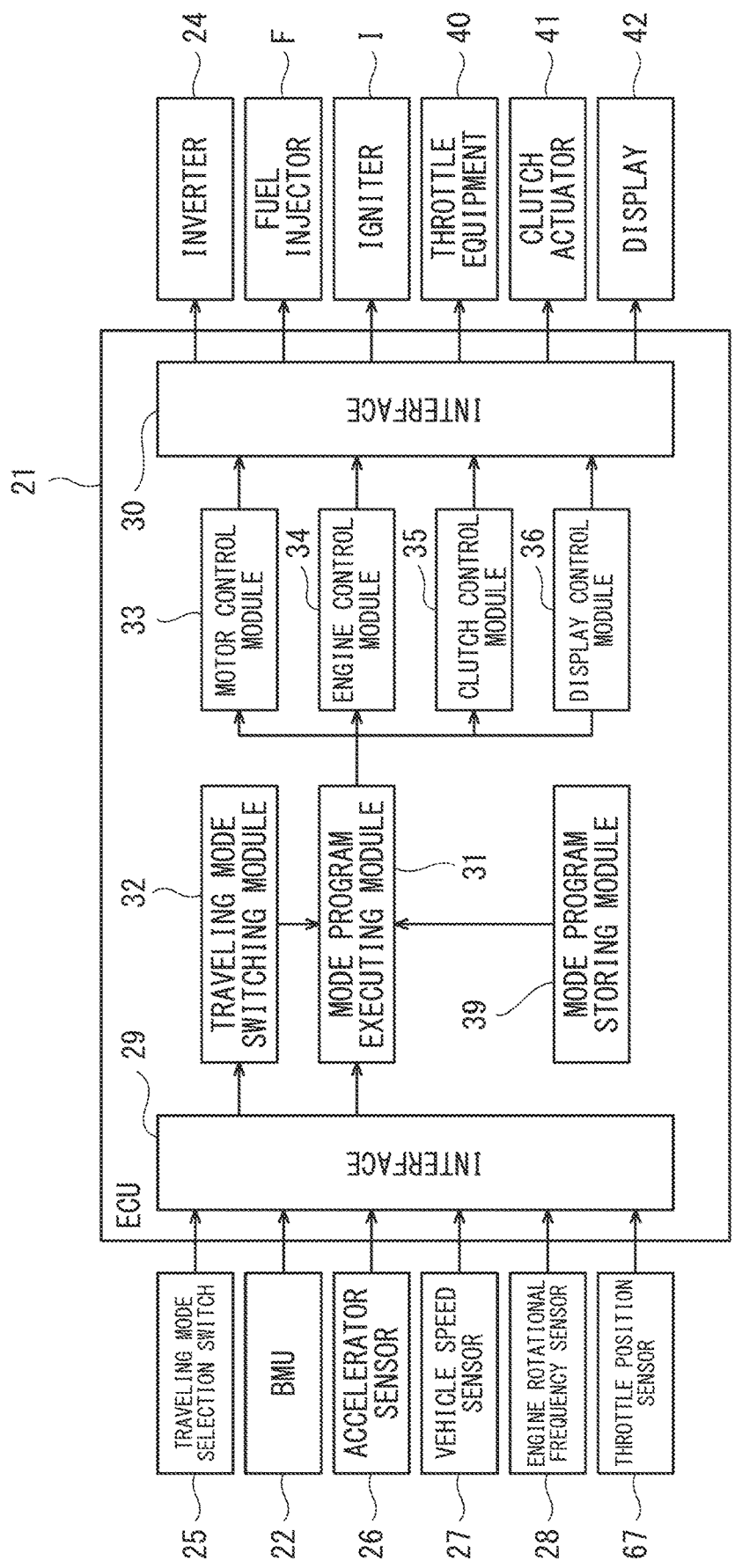
FIG. 3 is a block diagram of a control system of the vehicle.

FIG. 3 is a block diagram of a control system of the vehicle 1 shown in FIG. 1. The ECU 21 receives output signals of a traveling mode selection switch 25, the BMU 22, an accelerator sensor 26, a vehicle speed sensor 27, an engine rotational frequency sensor 28, a throttle position sensor 67, and the like by an interface 29. The traveling mode selection switch 25 serves as a traveling mode input device that is a user interface to which a mode selection command is input from the rider to the vehicle 1. The rider can change the traveling mode by selecting and inputting the traveling mode through the traveling mode selection switch in accordance with a traveling situation and preference. The BMU 22 detects a remaining amount, voltage, and the like of the battery 23 (FIG. 2). The accelerator sensor 26 detects an operation amount (i.e., acceleration/deceleration request degree) of the accelerator manipulation element 10a operated by the rider. The vehicle speed sensor 27 detects a traveling speed of the vehicle 1. The engine rotational frequency sensor 28 detects a rotational frequency of the crank shaft Ea of the engine EG. The throttle position sensor 67 detects a position of a throttle valve of the engine EG.

The ECU 21 includes a processor, a system memory, a storage memory, and input-output interfaces 29 and 30 in terms of hardware. The processor may include, for example, a CPU (central processing unit). The system memory may include a RAM (Random Access Memory). The storage memory may include a ROM (Read Only Memory). The storage memory may include a hard disk and/or a flash memory. The storage memory stores a program. A configuration in which the processor executes the program read out into the system memory is one example of processing circuitry.

The ECU 21 includes a mode program executing module 31, a traveling mode switching module 32, a motor control module 33, an engine control module 34, a clutch control module 35, a display control module 36, and a mode program storing module 39 in terms of function. In the present embodiment, the storage memory includes the mode program storing module 39. The mode program storing module 39 stores mode programs used to set the traveling mode.

The interface 30 is connected to the inverter 24, the fuel injector F, the igniter I, the throttle equipment 40, a clutch actuator 41, and a display 42. The inverter 24 adjusts electric power, supplied to the drive motor M, to control the driving of the drive motor M. The fuel injector F adjusts the amount of fuel supplied to a combustion chamber of the engine EG. The igniter I controls the ignition of the fuel supplied by the fuel injector F in the engine EG. The throttle equipment 40 adjusts an intake air amount in the engine EG. The driving of the engine EG is controlled by controlling the fuel injector F, the igniter I, and the throttle equipment 40. The clutch actuator 41 controls whether to transmit the driving of the engine EG or the driving of the drive motor M to the rear wheel 3 or whether to transmit both of the driving of the engine EG and the driving of the drive motor M to the rear wheel 3.

The motor control module 33, the engine control module 34, and the clutch control module 35 control the driving of the power unit 13 when the vehicle 1 travels. The ECU 21 sets the traveling mode in such a manner that the mode program executing module 31 performs calculation processing in accordance with information from the accelerator sensor 26, the vehicle speed sensor 27, and the engine rotational frequency sensor 28 or an input from the rider through the traveling mode selection switch 25 and also in accordance with the program stored in the mode program storing module 39.

The mode program executing module 31 makes the motor control module 33, the engine control module 34, and the clutch control module 35 control the outputs of the inverter 24, the fuel injector F, and the igniter I in accordance with the set traveling mode to control the output of the drive motor M and the output of the engine EG. The traveling mode set by the mode program executing module 31 in accordance with the program stored in the mode program storing module 39 can be changed by the switching of the traveling mode switching module 32. The set traveling mode can be switched in such a manner that a signal for the switching of the traveling mode is transmitted from the traveling mode switching module 32 to the mode program executing module 31.

The mode program storing module 39 prestores plural types of traveling mode programs. In the traveling mode program, whether or not the drive motor M is driven, whether or not the engine EG is driven, and a rate of driving torque distributed to the drive motor M and driving torque distributed to the engine EG are determined. For example, in the traveling mode program, state changes of the drive motor M and the engine EG which correspond to vehicle conditions (such as required torque and an engine rotational frequency) are determined.

The motor control module 33 controls the inverter 24 in accordance with a command from the mode program executing module 31 to control the operation of the drive motor M. The engine control module 34 controls the fuel injector F, the igniter I, and the throttle equipment 40 in accordance with the command from the mode program executing module 31 to control the operation of the engine EG. The clutch control module 35 controls the clutch actuator 41 in accordance with the command from the mode program executing module 31. The present embodiment has described an example in which the motor control module 33, the engine control module 34, the clutch control module 35, and the display control module 36 are connected to the interface 30 in the ECU 21. However, the present embodiment is not limited to this. A control module other than the motor control module 33, the engine control module 34, the clutch control module 35, and the display control module 36 may be connected to the interface 30. Moreover, only some of the motor control module 33, the engine control module 34, the clutch control module 35, and the display control module 36 may be connected to the interface 30. The control modules connected to the interface 30 do not have to be the above four control modules.

Moreover, the ECU 21 can store a program that detects an abnormal state of the throttle equipment or the like. Furthermore, the ECU 21 can store a program that detects an ignition failure state at the start of the engine.

In the present embodiment, the engine EG that is an internal combustion engine and the drive motor M are used as the driving sources in the vehicle 1. The vehicle 1 can travel by using only the driving power of the engine EG, by using only the driving power of the drive motor M, or by using both of the driving power of the engine EG and the driving power of the drive motor M. When only the driving power of the engine EG is used, the main clutch 16 is engaged to transmit the driving power of the engine EG to the rear wheel 3, and the inverter 24 stops the driving of the drive motor M to prevent the drive motor M from generating the driving power. The engine EG controls the igniter I, the throttle equipment 40, and the fuel injector F to control the engine torque or the engine rotational frequency. When only the driving power of the drive motor M is used, the main clutch 16 is disengaged to cut the connection between the crank shaft Ea of the engine EG and the output transmitting structure 20. In addition, the inverter 24 controls the drive motor M to control the motor torque or the motor rotational frequency. Moreover, when both of the driving power of the drive motor M and the driving power of the engine EG are used, the main clutch 16 is engaged to transmit the driving power of the engine EG to the rear wheel 3, and the inverter 24 controls the drive motor M to make the drive motor M generate the driving power. Therefore, the EV mode in which the vehicle 1 travels by using only the drive motor M and the HEV mode in which the vehicle 1 travels by using both of the drive motor M and the engine EG are selectably set as the traveling modes used when the vehicle 1 travels. In the present embodiment, the HEV mode includes a HEV-EL mode and a HEV-EG mode. When a predetermined switching allowable condition is satisfied, the vehicle 1 can switch the traveling mode while traveling.

In the HEV-EL mode, the vehicle 1 travels by using the engine EG and the drive motor M in combination but mainly using the drive motor M. For example, the HEV-EL mode is a traveling mode in which the power generated by the drive motor M is used as the driving power more preferentially than the power generated by the engine EG. Moreover, for example, when the vehicle 1 starts traveling in the HEV-EL mode, the driving wheel is driven by using the drive motor M. Furthermore, for example, after the vehicle 1 starts traveling by the drive motor M, the driving sources may be switched such that the output of the engine EG is auxiliary used in a region where using the driving of the engine EG is more efficient.

In the HEV-EG mode, the vehicle 1 travels by using the engine EG and the drive motor M in combination but mainly using the engine EG. For example, the HEV-EG mode is a traveling mode in which the power generated by the engine EG is used as the driving power more preferentially than the power generated by the drive motor M. Moreover, for example, when the vehicle 1 starts traveling in the HEV-EG mode, the driving wheel is driven by using the engine EG.

For example, the HEV-EL mode is set such that the number of opportunities of utilization of the drive motor is larger than that of the HEV-EG mode. Moreover, the HEV-EL mode may be set as such a mode that the purpose thereof is to suppress fuel consumption more than the HEV-EG mode. Furthermore, the HEV-EG mode may be set as such a mode that the purpose thereof is to increase driving output and responsiveness more than the HEV-EL mode. Hereinafter, the HEV-EG mode and the HEV-EL mode may be collectively called the HEV mode. Moreover, in the present embodiment, a WALK mode is set in addition to the EV mode, the HEV-EL mode, and the HEV-EG mode. In the WALK mode, the vehicle 1 slowly travels only by the driving of the drive motor. Moreover, in the present embodiment, in the WALK mode, the vehicle 1 can travel forward or rearward while slowly traveling. For example, the WALK mode is used when the rider gets off the seat 12 and operates the handlebar 10 or when the rider parks the vehicle 1. When the vehicle 1 travels on a traveling road surface, the EV mode, the HEV-EL mode, or the HEV-EG mode is used.

In the present embodiment, the HEV-EG mode and the HEV-EL mode are set as below. In the HEV-EL mode, the driving sources are set so as to be selected or used in combination such that the efficiency with respect to the energy consumption improves. For example, to increase the energy efficiency, the engine EG and the drive motor M may be used based on the energy efficiency such that the output of the drive motor M is used in a low rotation range, and the output of the engine EG is used in a high rotation range. Moreover, for example, the engine EG may be used in a rotation range where the energy efficiency by the engine EG is high, and the drive motor M may be used in the other region.

In the HEV-EG mode, the driving of the engine EG is used in most or all of the opportunities of the traveling. Moreover, in the HEV-EG mode, the drive motor M is used to add the driving power in the rotation range where only the power of the engine EG does not satisfy required output. For example, the drive motor M is used to add the output in the low rotation range where the torque of the engine EG is small. Moreover, for example, the output of the drive motor M is used in addition to the output of the engine EG when the acceleration request of the rider is large, such as when an accelerator is quickly opened or when an acceleration switch is operated.

Figure 4:
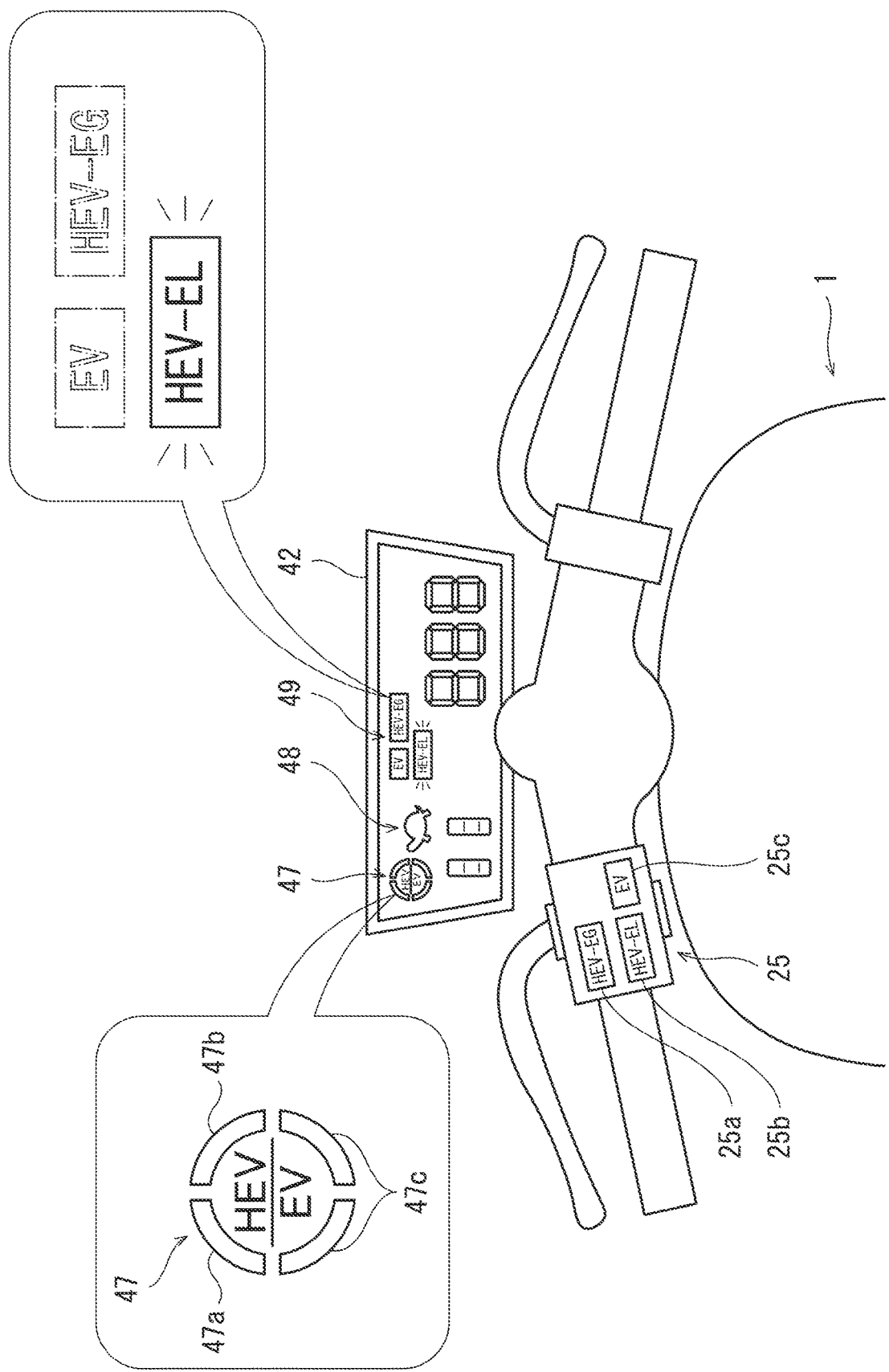
FIG. 4 is a schematic plan view showing enlarged parts of a display.

FIG. 4 is a schematic plan view showing enlarged parts of the display 42 in the vehicle 1. In the present embodiment, a current mode indicator 49, a mode selection enablement indicator 47, and a limited state indicator 48 are located at the display 42 so as to be able to be display. The current mode indicator 49 displays the traveling mode that is being used for the traveling. For example, the current mode indicator 49 selectively turns on the indicator of one traveling mode that is currently used for the traveling among "EV," "HEV-EL," and "HEV-EG," and turns off the indicators of the other modes. Instead of turning off the indicators of the other traveling modes, the other traveling modes may be displayed in gray, i.e., the other traveling modes may be displayed so as to become low in visibility.

The mode selection enablement indicator 47 displays the traveling modes that can be set by the selection of the rider based on predetermined conditions regarding the traveling modes that are selectable. Specific examples of the traveling modes that are selectable will be described later. In the present embodiment, the traveling modes that are selectable by the rider change depending on the state of the vehicle. Therefore, by displaying the traveling modes that are selectable by the rider, the rider can grasp the traveling modes that are selectable.

The limited state indicator 48 shows a state where the driving of the driving source is limited by the processing circuitry. Herein, when the driving of the drive motor M as the driving source is limited, the limited state indicator 48 shows such limitation. For example, the limited state indicator 48 may be used to limit the driving of the drive motor M when the replacement of the battery is suggested or when the state of the motor or the state of the battery is not a normal state. In the present embodiment, an indicator imitating the appearance of a turtle is used as the limited state indicator 48. As above, the display 42 displays the mode selection enablement indicator 47 and the limited state indicator 48 which is turned on when the driving of the drive motor M is limited. In the present embodiment, the limited state indicator 48 is displayed only in the EV mode. In the HEV mode, when the drive motor M is in a limited state, the driving of the driving wheel by the engine EG may be realized. In this case, the limited state indicator 48 is not displayed on the display 42. Although not shown, the display 42 may include a warning indicator which is turned on when the driving of the engine EG is limited since the abnormal state of the throttle equipment is detected. The warning indicator of the engine EG is displayed in the HEV mode.

In the present embodiment, when the selection of the traveling mode by the rider is not limited, in other words, when all the traveling modes are selectable, a HEV-EG mode selection enablement indicator 47a, a HEV-EL mode selection enablement indicator 47b, and an EV mode selection enablement indicator 47c are turned on and displayed in the mode selection enablement indicator 47. In the present embodiment, the selection by the rider may be limited depending on the state of the vehicle. When the selection is limited, the indicator corresponding to the traveling mode which is not selectable by the rider is turned off. In other words, the on state of the indicator corresponding to the traveling mode that is selectable by the rider is maintained.

As shown in FIG. 4, in the present embodiment, the mode selection enablement indicator 47 is divided into four regions that are an upper-left region, an upper-right region, a lower-left region, and a lower-right region. Among these four regions, the two upper regions correspond to the HEV mode selection enablement indicators 47a and 47b, and the two lower regions correspond to the EV mode selection enablement indicator 47c. A left one of the two upper HEV mode selection enablement indicators corresponds to the HEV-EG mode selection enablement indicator 47a, and a right one thereof corresponds to the HEV-EL mode selection enablement indicator 47b. The two lower regions among the four regions correspond to the EV mode selection enablement indicator 47c.

When the EV mode is selectable, the EV mode selection enablement indicator 47c is turned on. Moreover, when the EV mode is not selectable, the EV mode selection enablement indicator 47c is turned off. When the HEV-EG mode is selectable, the HEV-EG mode selection enablement indicator 47a is turned on. Moreover, when the HEV-EG mode is not selectable, the HEV-EG mode selection enablement indicator 47a is turned off. When the HEV-EL mode is selectable, the HEV-EL mode selection enablement indicator 47b is turned on. Moreover, when the HEV-EL mode is not selectable, the HEV-EL mode selection enablement indicator 47b is turned off.

Moreover, the vehicle 1 includes a switch 25 to which the rider inputs the switching of the traveling mode. When the rider operates a HEV-EG mode switch 25a in the switch 25, a selection command of the HEV-EG mode can be input to the ECU 21. When the rider operates a HEV-EL mode switch 25b in the switch 25, the selection command of the HEV-EL mode can be input to the ECU 21. When the rider operates an EV mode switch 25c in the switch 25, the selection command of the EV mode can be input to the ECU 21. In the present embodiment, the switch 25 corresponds to the traveling mode selection switch 25 shown in FIG. 3. The configuration of the switch 25 is not limited to the above configuration. The traveling mode may be selected in such a manner that: the rider moves a cursor on the display 42; and when the cursor reaches the traveling mode that the rider wants to select, the rider operates a determination switch.

The mode selection enablement indicator 47, the limited state indicator 48, and the current mode indicator 49 are located at such positions that the rider can visually confirm during the traveling. The mode selection enablement indicator 47, the limited state indicator 48, and the current mode indicator 49 may be located in a region that is part of an instrument panel that shows a traveling state, for example. The instrument panel may display other information that needs to be confirmed during the traveling. For example, the instrument panel may also display the traveling speed, a fuel remaining amount, a battery remaining amount, and the like. Moreover, in the present embodiment, the traveling mode selection switch 25 is located in the vicinity of a grip opposite to a grip at which the accelerator manipulation element 10a is located.

Details of the switching of the traveling mode when the selection disabling condition is satisfied will be described. In the present embodiment, the selection disabling condition includes a condition that the battery remaining amount is less than a predetermined threshold A1. For example, the threshold A1 may be set to a value that is larger by a predetermined amount than a battery remaining amount by which the driving of the drive motor M becomes unstable. The predetermined amount may be set to an average amount that is estimated to be necessary from the start of the traveling until the stop of the traveling.

By utilizing the drive motor M during the traveling, the battery remaining amount of the vehicle 1 may decrease to become less than the threshold A1. In the present embodiment, first, whether or not the battery remaining amount has become less than the threshold A1 is detected. When the battery remaining amount has become less than the threshold A1, the selection of the HEV-EL mode is disabled, and the traveling mode of the vehicle 1 is switched to the HEV-EG mode. Specifically, when the vehicle 1 is in a stop state for a predetermined period of time, the traveling mode is switched to the HEV-EG mode by the ECU 21 regardless of the operation of the rider. In the present embodiment, when it is detected that the traveling speed is zero, and a throttle operation amount is in a fully closed state, it is determined that the vehicle 1 is in a stop state.

Figure 5:
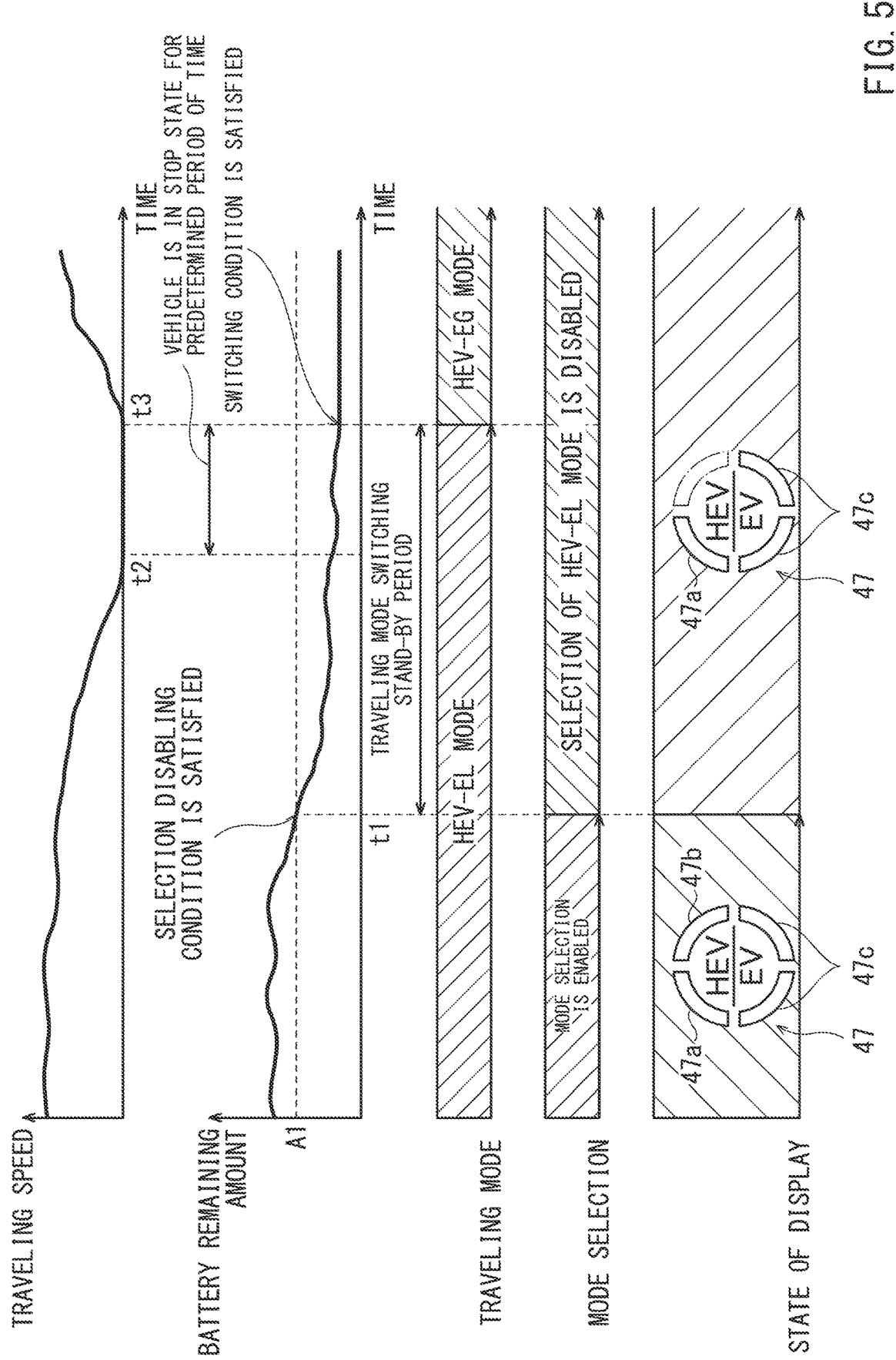
FIG. 5 is a timing chart showing a mode switching operation corresponding to a battery remaining amount.
Figure 6:
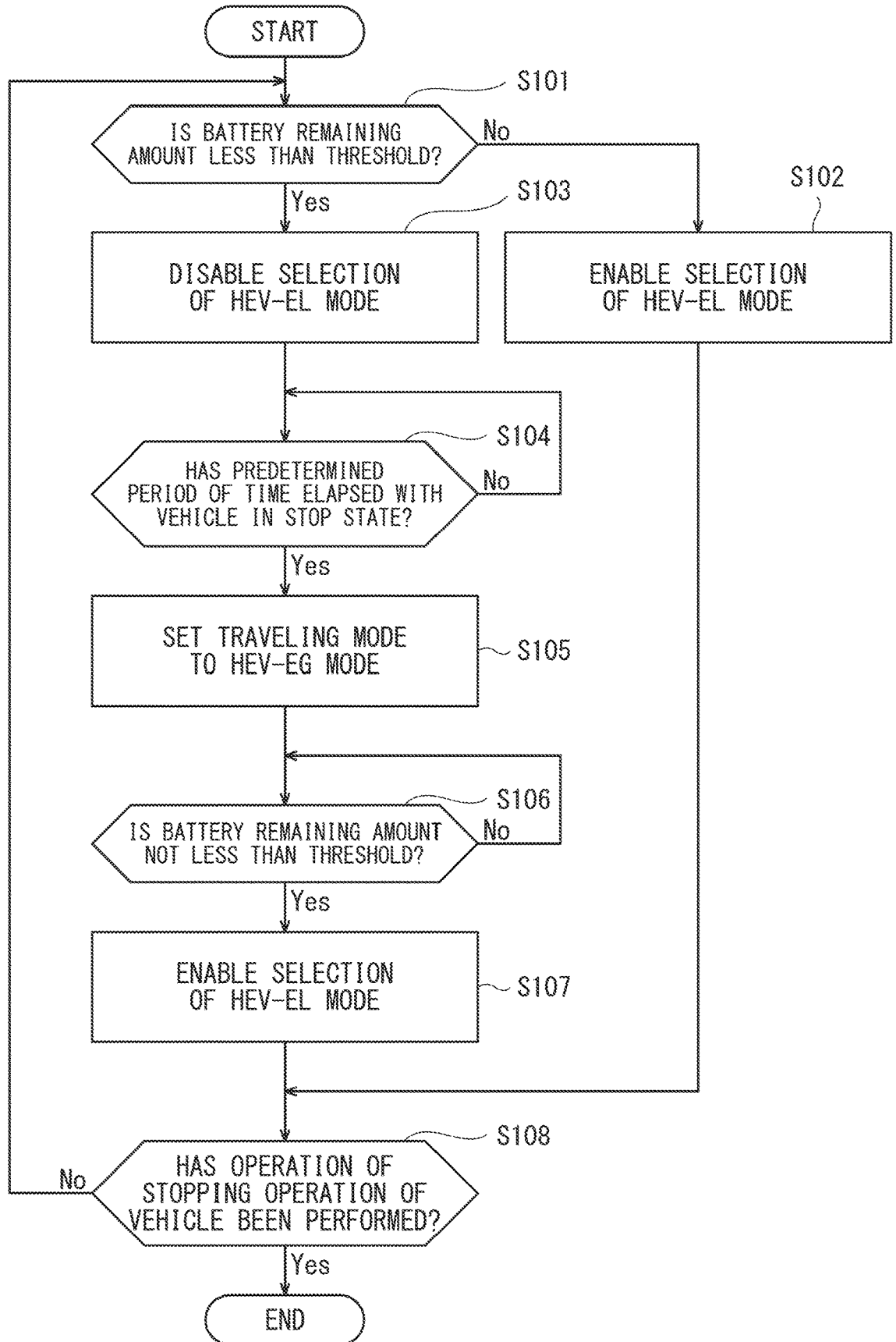
FIG. 6 is a flowchart showing the mode switching operation corresponding to the battery remaining amount.

FIG. 5 is a timing chart showing the traveling speed, the battery remaining amount, the traveling mode, the selection of the traveling mode, and the state of the display 42 along a time axis when the battery remaining amount of the vehicle 1 decreases to become less than the threshold A1, and the traveling mode of the vehicle 1 is switched from the HEV-EL mode to the HEV-EG mode. Moreover, FIG. 6 is a flowchart when the ECU 21 switches the traveling mode in accordance with a change in the battery remaining amount of the vehicle 1.

When the ECU 21 is supplied with driving electric power by, for example, the operation of a switch that starts electric power supply to respective electric components, the ECU 21 starts processing. In an initial stage, the vehicle 1 is traveling in the HEV-EL mode as the traveling mode. In this stage, all the traveling modes are selectable by the ECU 21. Moreover, the ECU 21 controls the display 42 to turn on all the selectable indicators 47a, 47b, and 47c. The ECU 21 executes a selection disablement determining step of determining whether or not the selection disabling condition has been satisfied (Step S101). In the present embodiment, whether or not the battery remaining amount is less than the threshold A1 is determined in the selection disablement determining step (Step S101).

When the ECU 21 determines in the selection disablement determining step (Step S101) that the battery remaining amount is not less than the threshold A1, the ECU 21 proceeds to a normal control step (Step S102). In the normal control step (Step S102), the ECU 21 enables the selection of the HEV-EL mode as the traveling mode and controls the power to the driving wheel by using the engine EG and the drive motor M. Therefore, the vehicle 1 can continue the setting of the HEV-EL mode without switching the traveling mode. At this time, the ECU 21 does not prohibit the setting of all the traveling modes. Therefore, the ECU 21 maintains the on states of all of the HEV-EG mode selection enablement indicator 47a, the HEV-EL mode selection enablement indicator 47b, and the EV mode selection enablement indicator 47c on the display 42. At this time, since the ECU 21 enables the selection of all the traveling modes, the rider who wants to change the traveling mode can change the traveling mode to another traveling mode without limitation. In the normal control step (Step S102), the ECU 21 executes normal control and then proceeds to a termination determining step (Step S108).

When the ECU 21 determines in the selection disablement determining step (Step S101) that the battery remaining amount is less than the threshold A1, the ECU 21 proceeds to a selection disabling step (Step S103). As shown in FIG. 5, when the battery remaining amount of the vehicle 1 decreases to become less than the threshold A1, the selection disabling condition is satisfied. In the selection disabling step (Step S103), the ECU 21 disables, in other words, prohibits the switching of the traveling mode to the HEV-EL mode by the selection of the rider. In this case, even when the rider operates the traveling mode selection switch to execute a switching request to the HEV-EL mode, such switching request is disabled. At this time, the ECU 21 controls the display 42 to turn off the HEV-EL mode selection enablement indicator 47b. Moreover, the ECU 21 maintains the enabled state of the selection of the HEV-EG mode as the traveling mode by the selection of the rider. In this case, when the rider operates the traveling mode selection switch to execute the switching request to the HEV-EG mode, the ECU 21 enables the switching request and switches the traveling mode to the HEV-EG mode. To be specific, the ECU 21 controls the display 42 to maintain the on state of the HEV-EG mode selection enablement indicator 47a. Moreover, when the rider does not select the switching of the traveling mode, the ECU 21 continues the traveling in the HEV-EL mode. When the ECU 21 terminates the selection disabling step (Step S103), the ECU 21 proceeds to a stop determining step (Step S104).

In the stop determining step (Step S104), the ECU 21 determines whether or not a switching condition has been satisfied, i.e., whether or not a predetermined period of time has elapsed with the vehicle 1 in a stop state. When the ECU 21 determines that the predetermined period of time has elapsed with the vehicle 1 in a stop state, the ECU 21 proceeds to a switching step (Step S105). In the switching step (Step S105), the ECU 21 switches the traveling mode from the HEV-EL mode to the HEV-EG mode regardless of the operation of the rider. At this time, in the current mode indicator 49 of the display 42, the ECU 21 turns off the indicator of the HEV-EL mode and turns on the indicator of the HEV-EG mode.

The above-described switching condition is a condition that even if the ECU 21 switches the traveling mode, such switching stands by until a state where the switching does not influence the driving feeling of the rider is realized. In the present embodiment, when the stop state of the vehicle 1 has continued for the predetermined period of time after the selection disabling condition has been satisfied, the switching to the HEV-EG mode is performed. As shown in FIG. 5, when the selection disabling condition is satisfied, and the stop state of the vehicle 1 is maintained for a predetermined period of time (t3–t2) from a time point t2 at which the vehicle 1 has stopped traveling to a time point t3, the switching to the HEV-EG mode is performed. To be specific, in a period from when the selection disabling condition has been satisfied until when the switching to the HEV-EG mode is performed, the HEV-EL mode is maintained. In other words, after the selection disabling condition is satisfied, a traveling mode switching stand-by period in which the switching to the HEV-EG mode stands by is set. For example, the predetermined period of time may be set to three seconds.

In the present embodiment, when the ECU 21 switches the traveling mode in the switching step (Step S105), the ECU 21 proceeds to a setting cancel determining step (Step S106). In the setting cancel determining step (Step S106), the ECU 21 determines whether or not the battery remaining amount is not less than a threshold. In the present embodiment, when the vehicle 1 travels in the HEV-EG mode, a period of time in which the vehicle 1 travels by the driving power of the drive motor M becomes short, and the battery remaining amount may recover by electric power generation of the engine during the traveling, regeneration by using the electric motor, and the like. Thus, when the battery remaining amount becomes not less than the threshold, the ECU 21 cancels the disablement of the selection of the HEV-EL mode. As above, when the battery remaining amount has recovered, the ECU 21 cancels the disablement of the selection of the HEV-EL mode, and the vehicle 1 can travel in the HEV-EL mode.

The threshold used to cancel the disablement of the selection of the HEV-EL mode when the battery remaining amount has recovered may be the same as the threshold A1 set in the selection disablement determining step (Step S101). However, it is preferable that the above threshold used to cancel the disablement of the selection of the HEV-EL mode be larger than the threshold A1. In the setting cancel determining step (Step S106), when the ECU 21 determines that the battery remaining amount is not less than the threshold, the ECU 21 proceeds to a canceling step (Step S107). In the canceling step (Step S107), the ECU 21 cancels the disablement of the selection of the HEV-EL mode by the rider. To be specific, the ECU 21 enables the selection of the HEV-EL mode. Moreover, in the canceling step (Step S107), the ECU 21 turns on the HEV-EL mode selection enablement indicator 47b to inform the rider that the disablement of the selection of the HEV-EL mode has been canceled. When the canceling step (Step S107) is terminated, the ECU 21 proceeds to the termination determining step (Step S108). In the termination determining step (Step S108), whether or not the operation of stopping the operation of the vehicle 1 has been performed by the rider is determined. For example, when a kill switch that terminates the electric power supply to the electric components is operated, the ECU 21 terminates the processing. When the ECU 21 determines in the termination determining step (Step S108) that the operation of terminating the traveling of the vehicle 1 has not been performed, the ECU 21 returns to the selection disablement determining step (Step S101). Moreover, when the ECU 21 determines even during the operations of the steps that the operation of stopping the operation of the vehicle 1 has been performed by the rider, the ECU 21 terminates the processing.

As described above, when the switching condition is satisfied after the selection disabling condition is satisfied, to reduce the electric power consumption by the driving of the drive motor M, the ECU 21 switches the traveling mode to the HEV-EG mode in which the number of opportunities of the driving of the drive motor M is small. According to the present embodiment, when the battery remaining amount is less than the threshold, the selection of the traveling mode that mainly uses the drive motor M as the driving source is disabled, and the traveling mode is switched from the HEV-EL mode to the HEV-EG mode. To be specific, when the battery remaining amount which is necessary to drive the drive motor M is small, the traveling mode is switched to the HEV-EG mode that mainly uses the engine EG as the driving source. Thus, the shortage of the energy remaining amount by the increase in the number of opportunities of the traveling using the energy of the battery is prevented.

In the present embodiment, as shown in FIG. 5, when the ECU 21 determines that the selection disabling condition has been satisfied, the ECU 21 switches the HEV-EL mode selection enablement indicator 47b from the on state to the off state to inform that the selection of the HEV-EL mode has been disabled. Thus, the rider can grasp the disablement of the selection of the traveling mode by the ECU 21, and this improves convenience. For example, when the rider has selected a specific traveling mode but cannot switch the traveling mode to the specific traveling mode, and the indicator corresponding to the specific traveling mode in the mode selection enablement indicator 47 is in the off state, the rider can recognize that the specific traveling mode is not selectable due to the disablement of the selection of the specific traveling mode. Therefore, the rider can easily understand that the switch is not out of order. Moreover, when the ECU 21 determines that the switching condition has been satisfied, "HEV-EL" in the current mode indicator 49 is turned off, and "HEV-EG" in the current mode indicator 49 is turned on. Thus, the rider can grasp the switching of the mode regardless of the operation of the rider, and this improves convenience.

In the present embodiment, a time point at which the HEV-EL mode is switched to the HEV-EG mode is a time point at which the selection disabling condition has been satisfied, and the predetermined switching condition has also been satisfied. Specifically, the time point at which the HEV-EL mode is switched to the HEV-EG mode is the time point t3 at which it is confirmed that the stop state of the vehicle 1 has continued for the predetermined period of time (t3–t2). To be specific, the ECU 21 maintains the traveling of the vehicle 1 during the traveling of the vehicle 1 without switching the traveling mode. Moreover, the ECU 21 switches the traveling mode when the vehicle 1 is in the stop state. As above, a traveling state suitable for the switching of the traveling mode is set as the switching condition. Thus, the deterioration of the driving feeling by the switching of the traveling mode is prevented. Therefore, in the present embodiment, both of the excessive decrease of the battery remaining amount and the deterioration of the driving feeling are prevented.

Moreover, when the battery remaining amount recovers to become not less than the threshold, the disablement of the selection of the HEV-EL mode is canceled. Therefore, the rider can select the HEV-EL mode again. In this case, to inform that the HEV-EL mode is selectable, the HEV-EL mode selection enablement indicator 47b is switched from the off state to the on state. Thus, the rider is made to recognize that the HEV-EL mode is selectable. Therefore, the options of the selection of the traveling mode by the rider can be increased. Moreover, in the present embodiment, a threshold of the battery remaining amount when the battery remaining amount recovers and the disablement of the selection of the HEV-EL mode is canceled is represented by A2, and the threshold A2 is larger than the threshold A1. Therefore, the traveling mode is prevented from switching frequently when the battery remaining amount is within a region in the vicinity of the threshold.

Moreover, according to the present embodiment, when the stop state of the vehicle 1 has continued for the predetermined period of time, the switching condition of the traveling mode is satisfied, and the traveling mode is switched to the HEV-EG mode. Therefore, the deterioration of the driving feeling of the rider due to the switching of the traveling mode in a period in which a vehicle body of the vehicle 1 is unstable since the vehicle 1 has started traveling immediately after the stop is suppressed. Thus, the switching of the traveling mode is performed when the vehicle body of the vehicle 1 is stable. Therefore, the change of the behavior of the vehicle body by the switching of the traveling mode is further prevented.

The above embodiment has described an example in which when the battery remaining amount has become less than the threshold, the selection of the HEV-EL mode by the selection of the rider is disabled. However, the above embodiment is not limited to this. The selection of the EV mode by the selection of the rider may be disabled when the battery remaining amount has become less than the threshold. To be specific, a first traveling mode in which the selection of the rider is disabled when the selection disabling condition has been satisfied may be the EV mode. To be specific, when the selection disabling condition of the EV mode is satisfied, and then, the predetermined switching condition is satisfied, the traveling mode may be switched from the EV mode to the HEV-EG mode. In this case, the switching condition when the HEV-EL mode is switched to the HEV-EG mode and the switching condition when the EV mode is switched to the HEV-EG mode may be the same as or different from each other. Moreover, as long as the number of opportunities of the driving of the drive motor M is made small when the battery remaining amount is small, the setting of the EV mode may be prohibited instead of prohibiting the setting of the HEV-EL mode. Moreover, when the battery remaining amount becomes less than the threshold, both of the selection of the HEV-EL mode and the selection of the EV mode by the selection of the rider may be prohibited. Moreover, when the battery remaining amount has become less than the threshold, the selection of the WALK mode by the selection of the rider may be disabled.

Typically, the battery remaining amount necessary when the vehicle 1 starts traveling is larger than the battery remaining amount necessary when the vehicle 1 normally travels. Therefore, the selection disabling condition may be satisfied when the battery remaining amount becomes less than the battery remaining amount necessary when the vehicle 1 starts traveling. Moreover, the selection disabling condition may be satisfied when the battery remaining amount becomes less than the battery remaining amount necessary when the vehicle 1 normally travels. As above, a state where the state of the battery (first energy source) that supplies energy to the drive motor M (first prime mover) is outside a predetermined normal range may include a state where the battery remaining amount has becomes less than the threshold.

Moreover, when the selection disabling condition has been satisfied, but the switching condition is not satisfied, and the battery remaining amount decreases to become less than a further lower threshold, the switching of the traveling mode may be performed even during the traveling for the purpose of protecting the battery. By forcibly switching the traveling mode, the output of the drive motor is suppressed, and the use amount of electric power in the battery is suppressed. In this case, the limited state indicator 48 may be displayed on the display 42.

Moreover, in the present embodiment, the selection disabling condition includes a condition that the state of the battery that supplies energy to the drive motor M is outside the predetermined normal range. When a predetermined traveling condition suitable for the switching of the traveling mode is satisfied, the traveling mode is switched to the traveling mode that mainly uses the engine EG. Therefore, the influence of the continuous use of the drive motor M on devices related to the driving of the drive motor M can be reduced. Moreover, for example, the selection disabling condition may include a condition that a battery temperature or a motor temperature is outside a predetermined range instead of the condition that the battery remaining amount is small. Moreover, the selection disabling condition may include a condition that the amount of current per unit time has exceeded a threshold, a condition that the degree of deterioration of the battery has exceeded a predetermined degree, or the like.

When the battery temperature is adopted as the selection disabling condition, and the battery temperature has become not less than a threshold, the ECU 21 may switch the traveling mode to the HEV-EG mode to reduce the use frequency of the drive motor M. For example, when a measured value of the battery temperature has become not less than a threshold B1, and then, the stop state of the vehicle 1 has continued for the predetermined period of time, the ECU 21 determines that the switching condition has been satisfied, and then, switches the traveling mode from the HEV-EL mode or the EV mode to the HEV-EG mode. Therefore, until the battery temperature decreases, and the measured value of the battery temperature becomes smaller than the threshold, the use frequency of the drive motor M can be reduced. Thus, the further increase in the battery temperature by the increase in the number of opportunities of the traveling by using the energy in the battery is prevented.

Moreover, when the traveling mode is switched from the HEV-EL mode or the EV mode to the HEV-EG mode, the vehicle 1 travels in the HEV-EG mode, and this reduces a period of time in which the vehicle 1 travels by the driving power of the drive motor M. Therefore, the use frequency of the battery decreases, and this may lower the battery temperature. When the battery temperature becomes not more than a threshold temperature, the disablement of the selection of the HEV-EL mode or the EV mode may be canceled. Moreover, when the battery temperature has become not less than a second threshold B2 that is further higher than the threshold B1 while the vehicle 1 is traveling in the HEV-EL mode or the EV mode, the ECU 21 may switch the traveling mode to the HEV-EG mode even during the traveling without waiting for the satisfaction of the switching condition for the purpose of protecting the motor and the battery. Moreover, in this case, when the vehicle 1 travels in the HEV-EL mode, the driving of the drive motor M may be performed such that the output of the drive motor M is suppressed.

Moreover, in the present embodiment, when the selection disabling condition is satisfied, the selection of the traveling mode that mainly uses the drive motor M is disabled. Then, when the switching condition is satisfied, the traveling mode is switched to the HEV-EG mode. However, the present embodiment is not limited to this. When the selection disabling condition has been satisfied, and the state of the battery is outside the normal range, the driving of the drive motor M may be stopped.

The selection disabling condition may include another condition that the state of the battery that supplies energy to the drive motor M is outside a predetermined normal range. For example, the selection disabling condition may include a condition that a discharge amount of current from the battery is excessively small. Moreover, the selection disabling condition may include a condition that an abnormality of the drive motor M has occurred.

Moreover, the selection disabling condition may include a condition that the vehicle 1 cannot start traveling by the driving of the drive motor M. To be specific, the vehicle 1 may be controlled such that when it is detected that the vehicle 1 cannot start traveling by the driving of the drive motor M, the selection disabling condition for the disablement of the selection of the HEV-EL mode or the EV mode is satisfied. In this case, when it is detected that the vehicle 1 cannot start traveling by the driving of the drive motor M, and it is also detected that the vehicle 1 is in a stop state, the selection of the HEV-EL mode or the EV mode may be disabled. Moreover, in this case, the HEV-EL mode selection enablement indicator 47b and the EV mode selection enablement indicator 47c may be turned off on the display 42, i.e., the disablement of the selection of the HEV-EL mode or the EV mode may be displayed on the display 42.

Moreover, a case where the selection disabling condition is satisfied when the vehicle 1 travels in the traveling mode (for example, the HEV-EL mode) that mainly uses the drive motor M does not have to be a case where the selection disabling condition is satisfied when the vehicle 1 cannot start traveling by the drive motor M. The vehicle 1 may be controlled such that the selection disabling condition is satisfied when the vehicle 1 cannot start traveling by the drive motor M but can travel by using the engine EG. For example, the vehicle 1 may be controlled such that the selection disabling condition is satisfied when the vehicle 1 cannot start traveling by the drive motor M, and the traveling mode can be switched to the traveling mode (for example, the HEV-EG mode) other than the traveling mode that mainly uses the drive motor M. Moreover, the vehicle 1 may be controlled such that the selection disabling condition is satisfied when the vehicle 1 cannot start traveling by the drive motor M but can start traveling by the engine EG.

Moreover, a state where the vehicle 1 can start traveling by the drive motor M may be realized when, for example, all of the following conditions are satisfied. For example, when all of the following conditions are satisfied, it may be determined that the vehicle 1 can start traveling by the drive motor M. These conditions include: a condition that the battery remaining amount is not less than a predetermined value; a condition that maximum output at the time of the driving by the drive motor M is not less than a predetermined value; a condition that the engine EG can be started by using an ISG (Integrated Starter Generator); a condition that there is no abnormality of the start of the engine EG; and a condition that there is no abnormality at a power train through which the driving power is transmitted to the driving wheel when the driving of the drive motor M is performed. The maximum output by the drive motor M changes depending on the battery temperature and the temperature of the drive motor M. Moreover, whether or not the engine EG can be started by using the ISG changes depending on the battery temperature and the temperature of the drive motor M.

Moreover, a threshold of the battery remaining amount in a condition (motor traveling start disabling condition) based on which the ECU 21 determines that the vehicle 1 cannot start traveling by the drive motor M and a threshold of the battery remaining amount in a condition (motor traveling start enabling condition) based on which the ECU 21 determines that the vehicle 1 can start traveling by the drive motor M may be different from each other. The threshold of the battery remaining amount in the condition based on which the ECU 21 determines that the vehicle 1 cannot start traveling by the drive motor M may be set to be smaller than the threshold of the battery remaining amount in the condition based on which the ECU 21 determines that the vehicle 1 can start traveling by the drive motor M. Moreover, the threshold of the battery remaining amount in the condition based on which the ECU 21 determines that the vehicle 1 cannot start traveling by the drive motor M and the threshold of the battery remaining amount in the condition based on which the ECU 21 determines that the vehicle 1 can start traveling by the drive motor M may be the same as each other.

Moreover, a threshold of the battery remaining amount in a condition based on which the ECU 21 determines that the vehicle 1 cannot start traveling by the drive motor M in the HEV-EL mode and a threshold of the battery remaining amount in a condition based on which the ECU 21 determines that the vehicle 1 cannot start traveling by the drive motor M in the EV mode may be the same as or different from each other.

Moreover, the above embodiment has described an example in which when the selection disabling condition is satisfied, the switching condition is satisfied, and the traveling mode is switched. However, the above embodiment is not limited to this. The traveling mode may be switched when the above selection disabling condition is not satisfied. The vehicle 1 may be controlled such that: when an abnormality condition indicating a predetermined vehicle state is satisfied, the traveling mode continues; and when the switching condition is satisfied, the traveling mode is switched to another traveling mode regardless of the user's selection. Another traveling mode in this case may be such a traveling mode that the satisfaction of the abnormality condition can be avoided. The abnormality condition in this case may include, for example, a condition that the vehicle 1 cannot start traveling by the driving of the drive motor M. Another traveling mode in this case may be such a traveling mode that the satisfaction of this condition can be avoided. When the abnormality condition is satisfied since the vehicle 1 cannot start traveling by the driving of the drive motor M, the traveling mode of the vehicle 1 may be switched to the traveling mode (for example, the HEV-EG mode) that uses the engine EG, regardless of the user's selection. In this case, the satisfaction of the abnormality condition does not have to be displayed on the display 42.

As above, the abnormality condition may be a condition that is satisfied when the vehicle 1 includes two prime movers, and the vehicle 1 cannot start traveling by the driving power of one of the prime movers. In this case, the traveling mode which is enabled when the abnormality condition is satisfied and which can avoid the satisfaction of the abnormality condition may be a traveling mode in which the prime mover different from the prime mover that cannot start the traveling of the vehicle 1 is used to drive the driving wheel. Moreover, the abnormality condition may be a condition that is satisfied when the vehicle 1 includes only one prime mover. In this case, the vehicle 1 may include the traveling modes, and the abnormality condition may be a condition that is satisfied when the vehicle 1 cannot start traveling in one of the traveling modes. For example, when the vehicle 1 includes only the drive motor M as the prime mover and includes as the traveling modes the first traveling mode and a second traveling mode in which the electric power consumption of the battery is smaller than that in the first traveling mode under the same driving conditions, the abnormality condition may be a condition that is satisfied when the vehicle 1 cannot start traveling in a case where the first traveling mode continues. Moreover, the abnormality condition may be a condition that is satisfied when the vehicle 1 cannot start traveling in the first traveling mode. In this case, the traveling mode which is enabled when the abnormality condition is satisfied and which can avoid the satisfaction of the abnormality condition may be the second traveling mode.

Moreover, the present embodiment has described an example in which the switching condition is satisfied when the vehicle 1 is in a stop state for a predetermined period of time. However, the above embodiment is not limited to this. The switching condition may be satisfied when the driving power transmitted from the engine EG or the drive motor M to the driving wheel in the vehicle 1 is not more than a predetermined value. To be specific, the switching condition may be satisfied not only when the vehicle 1 is completely in a stop state but also when the vehicle 1 is traveling but is not accelerating. When the vehicle 1 is not accelerating although the vehicle 1 is traveling, the influence of the switching of the traveling mode on the driving feeling of the rider is made small.

Moreover, the present embodiment has described an example in which the switching condition is satisfied when the vehicle 1 is in a stop state for a predetermined period of time. However, the above embodiment is not limited to this. The switching condition may be satisfied when the stop state of the vehicle 1 is detected. To be specific, even when the vehicle 1 is not in a stop state for a predetermined period of time, the switching condition may be satisfied when it is detected that the vehicle 1 is in a stop state even for a moment. In this case, the traveling mode is switched to the HEV-EG mode when it is detected that the vehicle 1 is in a stop state. Therefore, the traveling mode can be switched when the driving power transmitted to the driving wheel is zero. Thus, the change of the behavior of the vehicle body by the switching of the traveling mode can be reduced. Therefore, the uncomfortable feeling of the rider is suppressed.

Moreover, the switching condition may be a condition other than the above conditions. The switching condition may be satisfied in another traveling state as long as the traveling state does not influence the driving feeling of the rider. For example, the traveling mode may be switched when the vehicle 1 is traveling at a constant speed, at a speed that is changing, in a neutral state, or the like.

In the present embodiment, when the battery remaining amount becomes less than the threshold, the selection of the HEV-EL mode as the traveling mode by the rider to is disabled. The threshold of the battery remaining amount at this time is desirably set such that the electric power which is necessary to drive the engine EG remains in the battery. In the present embodiment, the battery that drives the drive motor M supplies the electric power to the electrical components of the engine EG. Examples of the electric components of the engine EG include a starter motor, an ignition plug, an electronic throttle, and an ECU. When the electric power necessary to drive the engine EG remains in the battery in a case where the battery remaining amount decreases, and the traveling mode is switched to the HEV-EG mode, the vehicle 1 can continue to travel by the driving of the engine EG. Therefore, the threshold of the battery remaining amount when the selection of the HEV-EL mode by the rider is disabled is desirably a remaining amount by which the electric power necessary to drive the engine EG can be supplied.

Moreover, the above embodiment has described an example in which the first prime mover is the drive motor M. However, the above embodiment is not limited to this. The first prime mover may be the engine EG. To be specific, the first energy source that supplies energy to the engine EG may be the fuel tank storing gasoline, and when the mount of gasoline in the fuel tank becomes less than a threshold, setting the HEV-EG mode may be prohibited, and the HEV-EL mode or the EV mode may be set.

When the first prime mover is the engine EG, the HEV-EG mode is selected during the traveling, and the engine EG is mainly used. When the fuel in the fuel tank decreases, the stop of the traveling may be determined, and the traveling mode may be switched to the traveling mode in which the fuel consumption by the engine EG is suppressed. For example, the traveling mode may be set to the HEV-EL mode. At this time, the selection of the HEV-EG mode may be disabled. Moreover, the traveling mode may be switched from the HEV-EG mode to the HEV-EL mode when the switching condition is satisfied. Then, the fuel may be supplied to the fuel tank, and when the remaining amount of the fuel exceeds a predetermined amount, the disablement of the selection of the HEV-EG mode may be canceled. In a stand-by period when the traveling mode is switched from the HEV-EG mode to the HEV-EL mode, the HEV-EL mode selection enablement indicator 47b may be turned off.

The following will describe a case where when the abnormality of the engine EG of the vehicle 1 is detected, the selection of the traveling mode that uses the engine EG is disabled. Whether or not there is an abnormality of the engine EG is detected, and when the abnormality of the engine EG is detected, the selection of the HEV mode (first traveling mode) among the traveling modes of the vehicle 1 is disabled. When the switching condition is satisfied in this state, the ECU 21 switches the traveling mode to the EV mode (second traveling mode). For example, the switching condition is set when the vehicle 1 is in a stop state for a predetermined period of time.

In the present embodiment, the vehicle 1 includes a sensor that can detect the state of the engine EG. One example of the sensor that detects the state of the engine EG is the throttle position sensor 67 that detects the operation abnormality of the throttle valve in the engine EG. One example of the case where the operation abnormality of the throttle valve is detected is a case where even when the rider operates the accelerator, the operation of the throttle valve is inadequate.

Figure 7:
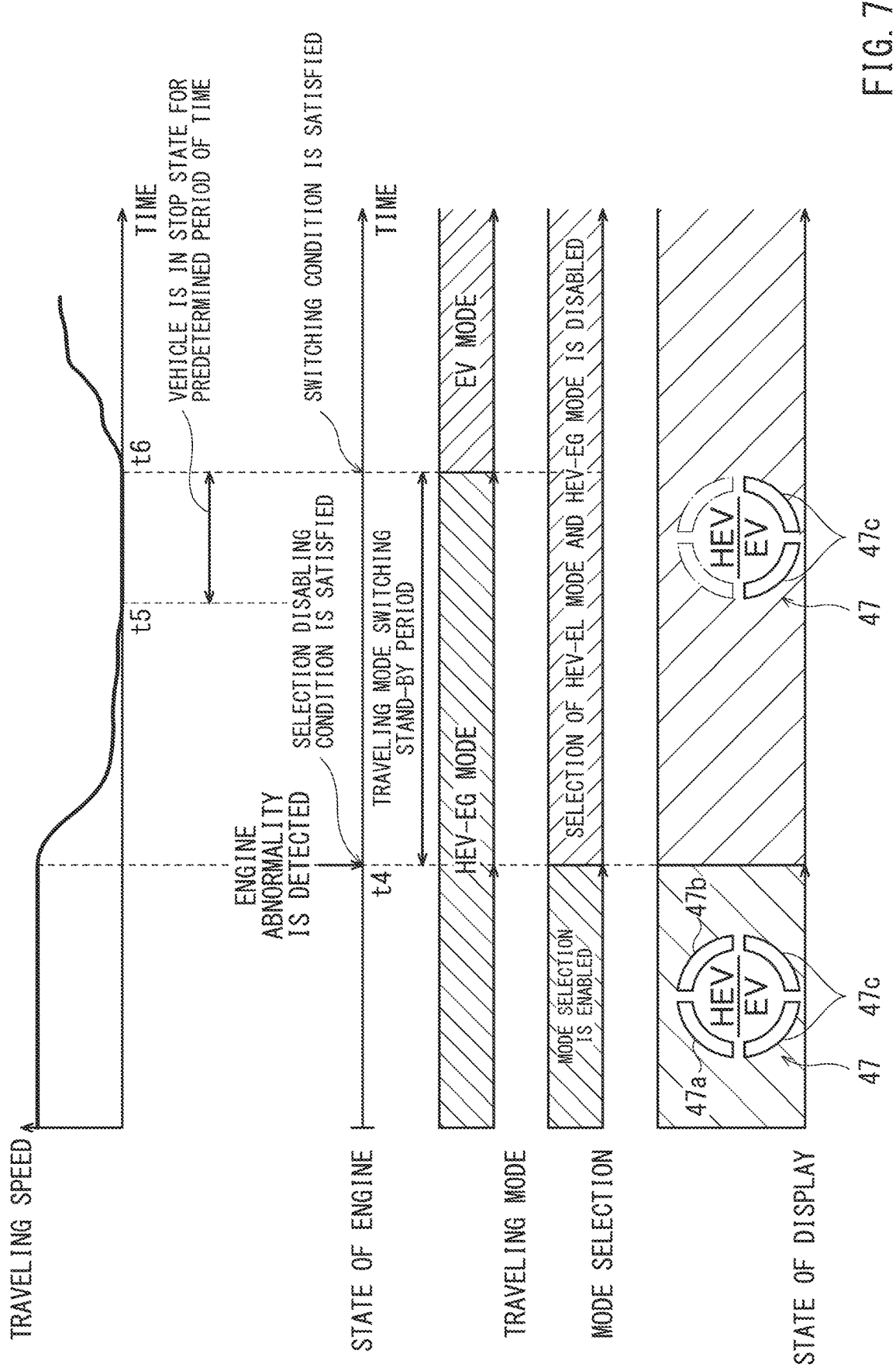
FIG. 7 is a timing chart showing the mode switching operation corresponding to an abnormality of an engine.
Figure 8:
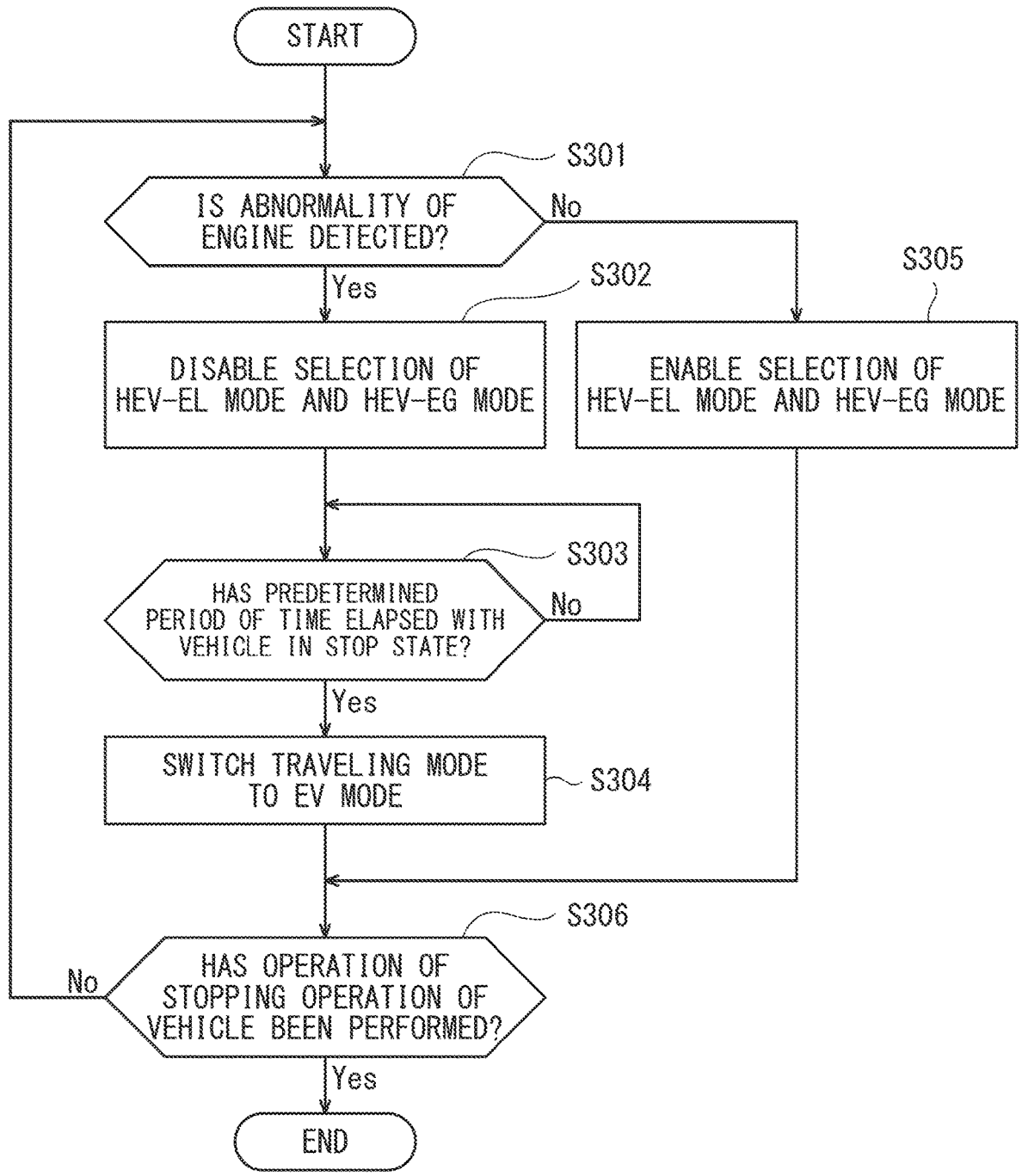
FIG. 8 is a flowchart showing the mode switching operation corresponding to the abnormality of the engine.

FIG. 7 is a timing chart showing the traveling speed, the state of the engine EG, the traveling mode, the selection of the traveling mode, and the state of the display 42 along a time axis when the abnormality of the engine EG of the vehicle 1 is detected, and the traveling mode of the vehicle 1 is switched from the HEV mode to the EV mode by the ECU 21 of the vehicle 1. FIG. 8 is a flowchart showing that the traveling mode of the vehicle 1 is switched from the HEV mode to the EV mode by the ECU 21 of the vehicle 1 when the abnormality of the engine EG of the vehicle 1 is detected.

In the present embodiment, when the ECU 21 is supplied with driving electric power by, for example, the operation of a switch that starts electric power supply to the respective electric components, the ECU 21 starts processing. In an initial stage, the traveling mode is set to the HEV-EG mode. In this stage, all the traveling modes are selectable by the ECU 21. Moreover, the ECU 21 controls the display 42 to turn on all the selectable indicators 47*a*, 47*b*, and 47*c*. First, the ECU 21 executes an engine abnormality determining step of determining whether or not the abnormality of the engine EG has been detected (Step S301). The ECU 21 determines whether or not the abnormality of the engine EG has been generated, based on a detection signal of the sensor that detects the state of the engine EG. When the abnormality of the engine EG has been detected in the engine abnormality determining step (Step S301), the ECU 21 controls the display 42 to turn on an engine warning lamp for warning of the abnormality of the engine EG. Moreover, the ECU 21 controls the engine EG to suppress the output in accordance with the degree of the abnormality of the engine EG. For example, when the degree of the abnormality of the engine EG is large, the traveling speed of the vehicle 1 is gradually reduced from a time point of the detection of the abnormality of the engine EG. When the engine abnormality determining step is executed, and the abnormality of the engine EG is detected, the ECU 21 proceeds to the selection disabling step (Step S302). In the selection disabling step (Step S302), the ECU 21 disables, in other words, prohibits the switching of the traveling mode to the HEV mode by the selection of the rider. At this time, the ECU 21 controls the display 42 to turn off both of the HEV-EG mode selection enablement indicator 47*a* and the HEV-EL mode selection enablement indicator 47*b*.

Moreover, the ECU 21 enables the selection of the EV mode as the traveling mode and maintains this enabled state. In this case, when the ECU 21 performs a switching request to the EV mode, and the switching condition is satisfied, the switching request is enabled, and the traveling mode is switched to the EV mode. To be specific, the ECU 21 controls the display 42 to maintain the on state of the EV mode selection enablement indicator 47*c*. When the ECU 21 terminates the selection disabling step of disabling the selection of the HEV mode (Step S302), the ECU 21 proceeds to the stop determining step (Step S303).

In the stop determining step (Step S303), the ECU 21 determines whether or not the switching condition has been satisfied, i.e., whether or not a predetermined period of time has elapsed with the vehicle 1 in a stop state. When the ECU 21 detects that the vehicle 1 is in a stop state for the predetermined period of time, the ECU 21 proceeds to the switching step (Step S304). In the switching step (Step S304), the ECU 21 switches the traveling mode from the HEV mode to the EV mode regardless of the operation of the rider. At this time, in the current mode indicator 49 of the display 42, the ECU 21 turns off the indicator of the HEV mode and turns on the indicator of the EV mode. The switching condition may be the same as the condition in the flowchart shown in FIG. 6. Moreover, in the switching step (Step S304), an output suppressed state by the abnormality of the engine is released, and the vehicle 1 can normally travels in the EV mode.

After the ECU 21 switches the traveling mode, the ECU 21 proceeds to the termination determining step (Step S306). In the termination determining step (Step S306), the ECU 21 determines whether or not the vehicle 1 has been operated to be stopped by the rider. For example, when the kill switch that terminates the electric power supply to the electric components is operated, the ECU 21 terminates the processing. When the ECU 21 determines in the termination determining step (Step S306) that the operation of terminating the traveling of the vehicle has not been performed, the ECU 21 returns to the engine abnormality determining step (Step S301). Moreover, when the ECU 21 determines even during the operations of the steps that the operation of stopping the operation of the vehicle 1 has been performed by the rider, the ECU 21 terminates the processing.

Moreover, when the ECU 21 determines in the engine abnormality determining step (Step S301) that there is no abnormality of the engine EG, the ECU 21 proceeds to the normal control step (Step S305). In the normal control step (Step S305), the ECU 21 enables the selection of the HEV mode as the traveling mode and controls the power to the driving wheel by using the engine EG and the drive motor M. Therefore, the vehicle 1 can continue the setting of the HEV mode without switching the traveling mode. At this time, the ECU 21 does not prohibit the setting of all the traveling modes. Therefore, the ECU 21 controls the display 42 to maintain the on states of the HEV-EG mode selection enablement indicator 47*a*, the HEV-EL mode selection enablement indicator 47*b*, and the EV mode selection enablement indicator 47*c*. At this time, since the ECU 21 enables the selection of all the traveling modes, the rider who wants to change the traveling mode can change the traveling mode to another traveling mode without limitation. In the normal control step (Step S305), the ECU 21 executes the normal control and then proceeds to the termination determining step (Step S306).

According to the present embodiment, the selection disabling condition is satisfied when the abnormality of the engine EG is detected. Therefore, when the selection disabling condition is satisfied, and the predetermined switching condition is satisfied, the ECU 21 automatically switches the traveling mode to the EV mode. Therefore, after the switching condition is satisfied, the vehicle 1 travels without using the driving of the engine EG. Thus, the vehicle 1 can continue to travel without being influenced by the abnormality of the engine EG. Preferably, until the abnormality of the engine is eliminated, the ECU 21 may control the display 42 to maintain the on state of the engine warning lamp.

As a case where the abnormality of the engine EG has been detected, the above embodiment has described a case where there is an abnormality at the throttle valve of the engine EG. However, the abnormality of the engine EG is not limited to the above embodiment. For example, when the abnormality of a sensor, the breakage of a wire, a conduction abnormality such as short-circuit, the operation abnormality of a clutch actuator, or the like is detected, the ECU 21 may determine that there is the abnormality at the engine EG. Moreover, when the temperature of cooling water which is detected by a water temperature gauge is high, the ECU 21 may determine that there is the abnormality at the engine EG.

As described above, when the predetermined selection disabling condition is satisfied, the ECU 21 disables the selection of the rider. Moreover, when the predetermined switching condition is satisfied, the ECU 21 determines to change the traveling mode regardless of the selection of the traveling mode by the rider in some cases. When the selection disabling condition is satisfied, and the predetermined switching condition is also satisfied, the ECU 21 forcibly switches the traveling mode regardless of the selection of the rider.

The following will describe a case where when the traveling mode of the vehicle 1 is the HEV-EG mode or the HEV-EL mode, and the abnormality of the start of the engine EG is detected due to the failure of cranking or the shortage of the fuel, the ECU 21 sets the traveling mode to the EV mode. When the abnormality of the start of the engine EG is detected as above, the traveling mode is switched from the HEV mode to the EV mode. When it is determined that the acceleration requested amount is not more than a threshold, the traveling mode is automatically switched to the EV mode.

Figure 9:
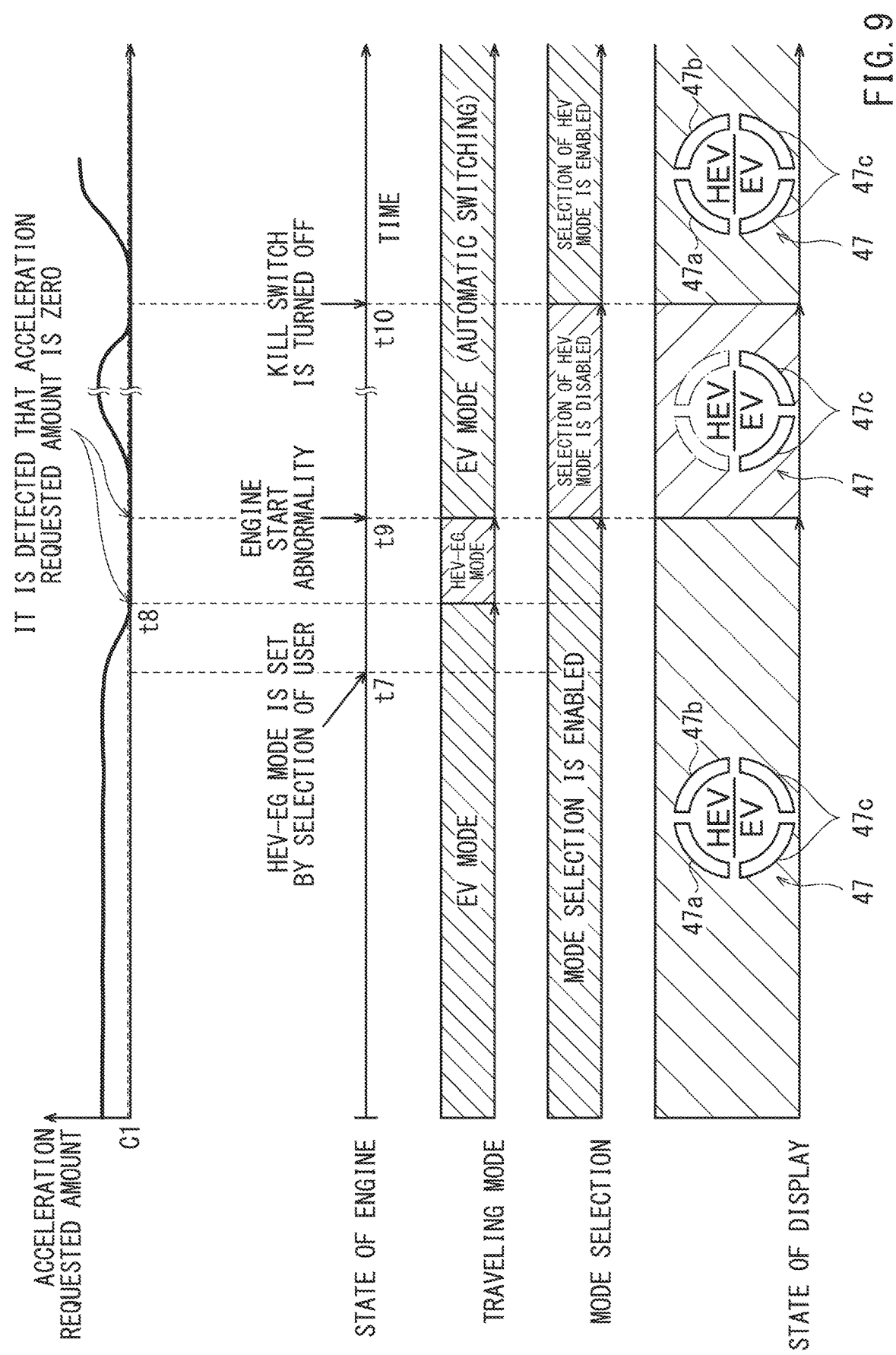
FIG. 9 is a timing chart showing the mode switching operation corresponding to an abnormality of the start of the engine.
Figure 10:
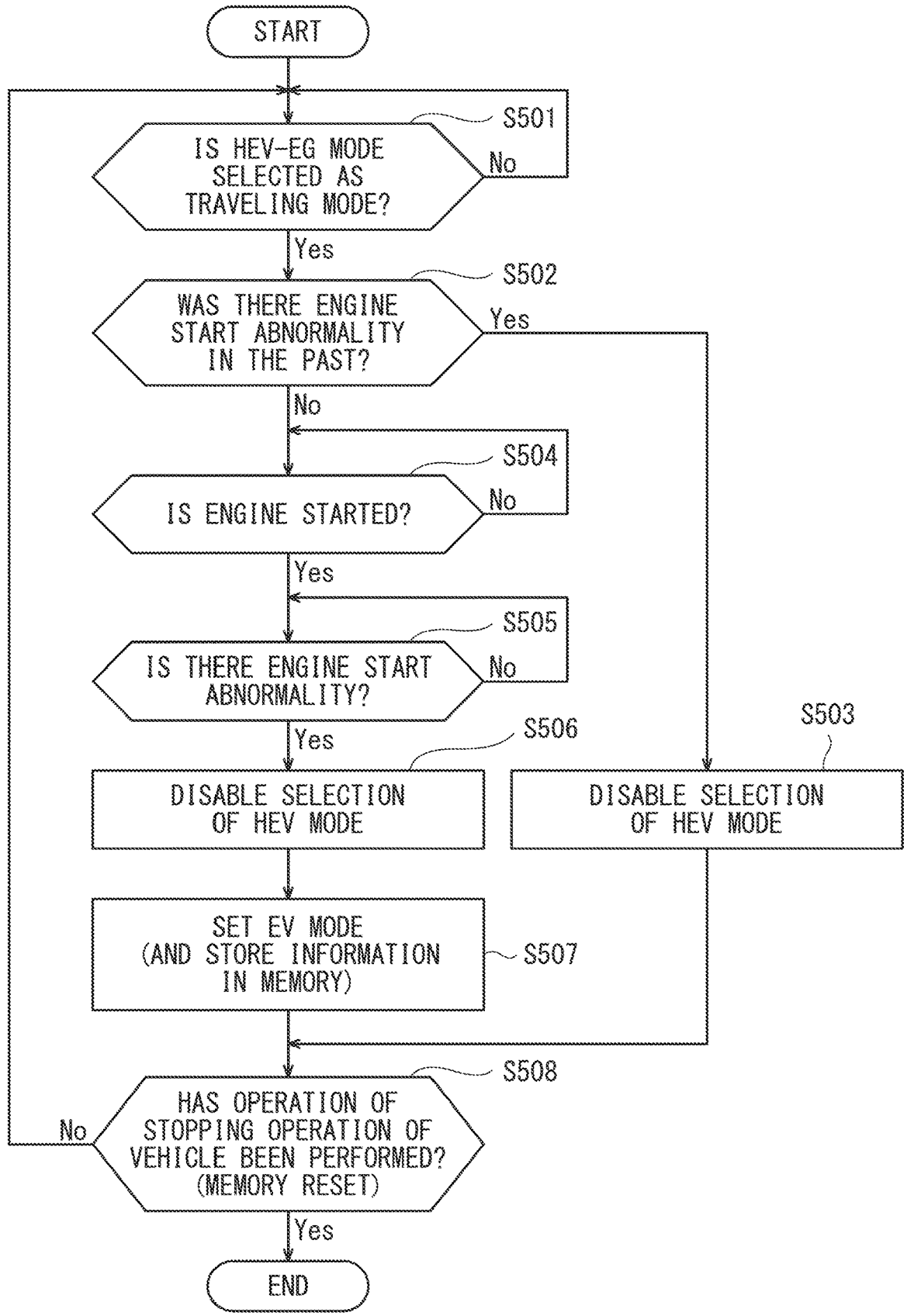
FIG. 10 is a flowchart showing the mode switching operation corresponding to the abnormality of the start of the engine.

FIG. 9 is a timing chart showing the acceleration requested amount, the state of the engine EG, the traveling mode, the selection of the traveling mode, and the state of the display 42 along a time axis when the abnormality of the start of the engine EG of the vehicle 1 is detected, and the traveling mode is set to the EV mode. Moreover, FIG. 10 is a flowchart showing that the traveling mode is set to the EV mode when the abnormality of the start of the engine EG of the vehicle 1 is detected.

In the present embodiment, when the ECU 21 is supplied with driving electric power by, for example, the operation of a switch that starts electric power supply to the respective electric components, the ECU 21 starts processing. In an initial stage, the traveling mode of the vehicle 1 is set to the EV mode. In this stage, all the traveling modes are selectable by the ECU 21. Moreover, the ECU 21 controls the display 42 to turn on all the selectable indicators 47a, 47b, and 47c. The ECU 21 executes an engine start determining step (Step S501). The ECU 21 repeats the engine start determining step (Step S501) until the ECU 21 determines to start the engine EG. In the present embodiment, whether or not the traveling mode has been set to the HEV-EG mode by the user's selection is determined in the engine start determining step (Step S501). When the HEV-EG mode is selected, the ECU 21 determines to start the engine EG and proceeds to an abnormality history determining step (Step S502). In the abnormality history determining step (Step S502), the ECU 21 reads information stored in the memory and determines whether or not there was an abnormality of the start of the engine EG in the past. When the ECU 21 determines that there was the abnormality of the start of the engine EG in the past, the ECU 21 turns on the EV mode selection enablement indicator 47c in the mode selection enablement indicator 47 and continues the traveling state only by the drive motor M without starting the engine EG. Then, the ECU 21 proceeds to the selection disabling step (Step S503). In the selection disabling step (Step S503), the ECU 21 disables the switching of the traveling mode to the HEV mode by the selection of the rider. At this time, the ECU 21 controls the display 42 to turn off the HEV-EG mode selection enablement indicator 47a and the HEV-EL mode selection enablement indicator 47b. Moreover, the ECU 21 controls the display 42 to maintain the on state of the EV mode selection enablement indicator 47c. After the ECU 21 executes the selection disabling step (Step S503), the ECU 21 proceeds to the termination determining step (Step S508).

When the ECU 21 determines in the abnormality history determining step (Step S502) that there is no abnormality of the start of the engine EG in the past, the ECU 21 proceeds to an engine start step (Step S504). Until a predetermined engine start condition is satisfied, the ECU 21 maintains the traveling state in the EV mode. When the predetermined engine start condition is satisfied, the ECU 21 executes engine start control. In the present embodiment, the engine start condition includes a condition that the acceleration requested amount by the rider has become not more than a threshold C1. For example, the threshold C1 is set to zero. When the ECU 21 determines during the traveling that the acceleration requested amount by the rider has become not more than the threshold C1, the ECU 21 switches the traveling mode to the HEV-EG mode which has been selected by the rider in the engine start determining step (Step S501), and the ECU 21 controls the ignition plug, the fuel injector, and the throttle valve to execute ignition start control of the engine EG. In the present embodiment, the engine start condition that the acceleration requested amount by the rider has become not more than the threshold C1 is set. However, for example, another condition that the vehicle speed or the acceleration is not more than a predetermined value may be set. When the ECU 21 executes the ignition start of the engine EG, the ECU 21 proceeds to a start abnormality determining step (Step S505).

The ECU 21 determines in the start abnormality determining step (Step S505) whether or not there is the abnormality of the start of the engine EG. When the ECU 21 receives a signal indicating the failure of the start of the engine EG from a sensor located at the engine EG, the ECU 21 determines that there is the abnormality of the start of the engine EG. For example, when it is determined based on the signal from a crank angle sensor that the engine rotational frequency does not increase even after plural ignition timings, the ECU 21 may determine that there is the failure of the start of the engine EG. When the ECU 21 determines in the start abnormality determining step (Step S505) that there is the failure of the start of the engine EG, the ECU 21 proceeds to the selection disabling step (Step S506). In the selection disabling step, the ECU 21 disables, in other words, prohibits the switching of the traveling mode to the HEV mode by the selection of the rider. At this time, the ECU 21 controls the display 42 to turn off both of the HEV-EG mode selection enablement indicator 47a and the HEV-EL mode selection enablement indicator 47b. When the ECU 21 terminates the selection disabling step (Step S506), the ECU 21 proceeds to an EV mode maintaining step (Step S507). In the EV mode maintaining step (Step S507), the ECU 21 stops the engine start control, turns on the EV mode selection enablement indicator 47c in the mode selection enablement indicator 47, and continues the traveling state only by the drive motor M without starting the engine EG. Moreover, in the EV mode maintaining step, the ECU 21 stores information indicating that there was the abnormality of the start of the engine EG, in an internal memory or an external memory. When the ECU 21 stores the abnormality of the start of the engine EG in the memory, the ECU 21 proceeds to the termination determining step (Step S508).

In the termination determining step (Step S508), the ECU 21 determines whether or not the operation of stopping the operation of the vehicle 1 has been performed by the rider. When the ECU 21 determines that the kill switch that terminates the electric power supply to the electric components has been operated, as the determination regarding whether or not the operation of stopping the operation of the vehicle 1 has been performed, the ECU 21 deletes, i.e., resets the engine start abnormality information stored in the memory and then terminates the processing. When the ECU 21 determines in the termination determining step (Step S508) that the operation of stopping the vehicle 1 has not been performed, the ECU 21 returns to the engine start determining step (Step S501). Moreover, when the ECU 21 determines even during the operations of the steps that the operation of stopping the vehicle 1 has been performed by the rider, the ECU 21 terminates the processing.

Moreover, when the ECU 21 determines in the start abnormality determining step (Step S505) that there is no abnormality of the start of the engine EG, in other words, determines that the engine EG has normally started, the ECU 21 returns to and repeats the start abnormality determining step (Step S505). To be specific, until the abnormality of the start of the engine EG is detected in the start abnormality determining step (Step S505), the ECU 21 repeats the start abnormality determining step (Step S505).

In the present embodiment, when there is the failure of the start of the engine EG, the vehicle 1 switches to the traveling by the driving of the drive motor M. Therefore, a bad influence on the feeling during the traveling due to the repetition of the failure of the engine EG is prevented. Moreover, even when the failure of the start of the engine EG occurs, the information of the failure of the start of the engine EG which is stored in the memory is deleted by turning off the kill switch. Thus, when the kill switch is turned off, and then, the start operation is performed, the start of the engine EG can be tried again. Moreover, in the present embodiment, the switching of the traveling mode in the engine start step (Step S504) is the switching of the traveling mode which reflects the selection of the rider in the engine start determining step (Step S501). Therefore, even when the traveling mode is switched during the traveling without the stop of the traveling, the influence on the feeling of the rider is small, and the traveling mode can be switched quickly. Moreover, even when the engine start condition which is different from the selection of the rider is satisfied in the engine start determining step (Step S501), the engine EG is started when the engine start condition that the acceleration requested amount is not more than the threshold C1 is satisfied in the engine start step (Step S504). Therefore, the influence on the feeling of the rider can be reduced. Moreover, when the rider can accept the uncomfortable feeling caused by the start of the engine EG, the engine start condition may be eased. Examples of the case where the engine start condition is eased include a case where the rider performs a speed change operation and a case where a time change of the acceleration requested amount is large. Therefore, when the start of the engine EG has succeeded, the rider can travel by the driving of the engine EG.

In the present embodiment, when the ignition failure of the engine is detected, the traveling mode is switched from the HEV-EG mode to the EV mode even if the vehicle 1 is not in a stop state. Therefore, since the traveling mode is switched to the EV mode during the traveling of the vehicle 1, the continuity of the traveling can be secured. For example, in the EV mode maintaining step (Step S507), when the condition that the acceleration requested amount of the rider is not more than the threshold C1 is satisfied, the traveling mode may be switched to the EV mode but does not have to be switched to the EV mode. For example, when the switching condition that the traveling speed or the acceleration becomes not more than a predetermined value is satisfied, the traveling mode may be switched to the EV mode. Moreover, immediately after it is determined in the start abnormality determining step (Step S505) that there is the abnormality of the start of the engine EG, the traveling mode may be switched to the EV mode without the setting of the switching condition.

In the present embodiment, when the abnormality of the start of the engine EG is detected, the selection of the HEV mode is disabled. Therefore, a condition that the abnormality of the start of the engine EG has been detected is set as the selection disabling condition. Moreover, in the present embodiment, when the acceleration requested amount of the rider is not more than the threshold, the traveling mode is switched to the EV mode. Therefore, a condition that the acceleration requested amount of the rider is not more than the threshold is set as the switching condition. Moreover, as described above, another condition that the vehicle speed or the acceleration is not more than a predetermined value may be set as the switching condition.

Moreover, in the present embodiment, whether or not the selection command of the HEV-EG mode has been given by the rider is determined in the engine start determining step (Step S501). However, the start of the engine EG may be determined when another condition is satisfied. For example, when the ECU 21 determines that an engine start condition programmed in advance has been satisfied, the ECU 21 may determine the start of the engine EG. Specifically, in the HEV-EL mode, when the engine start condition has been satisfied, the engine start determining step (Step S501) may be executed.

According to the present embodiment, when there is the abnormality of the start of the engine EG, the switching to the traveling mode that uses the driving of the engine EG is prevented. Therefore, the vehicle 1 can continue to travel while suppressing the influence of the abnormality of the start of the engine EG.

Moreover, according to the present embodiment, when it is determined that the abnormality of the start of the engine EG was detected in the past, setting the HEV mode that uses the driving of the engine is prohibited. Therefore, in a case where there is a high possibility that the abnormality of the start of the engine EG occurs, the restart of the engine EG is prevented. Thus, the abnormality of the start of the engine EG is prevented from repeatedly occurring.

In the above embodiment, the threshold C1 of the acceleration requested amount is set to zero. However, the above embodiment is not limited to this. The threshold C1 of the acceleration requested amount when the traveling mode is switched does not have to be zero. The threshold C1 of the acceleration requested amount does not have to be zero as long as the acceleration requested amount is such a small value that the traveling mode can be switched by the vehicle 1 in a stable state.

Moreover, in the above embodiment, FIG. 4 shows one example of the indicators of the display 42 in the vehicle 1. However, the above embodiment is not limited to this. The indicators of the display 42 may be different indicators. The colors of the indicators may be different from each other.

The shapes of the indicators may be different from each other. Moreover, indicators of different functions, such as a tachometer, may be displayed. Moreover, the same functions as the current mode indicator 49, the mode selection enablement indicator 47, and the limited state indicator 48 shown in FIG. 4 may be displayed on the display 42 in different forms.

Moreover, the above embodiment has described an example in which the vehicle 1 is a hybrid vehicle. However, the above embodiment is not limited to this. The vehicle does not have to be a hybrid vehicle. When a vehicle is an engine vehicle including only an engine or an electric vehicle including only a drive motor, and the vehicle includes traveling modes, the vehicle control of the present disclosure may be applied to such vehicle. For example, the vehicle control may be performed such that when (i) a vehicle includes only a drive motor as the prime mover, (ii) the selection disabling condition is satisfied due to the shortage of the battery remaining amount, and (iii) the switching condition is satisfied, the traveling mode is switched, regardless of the user's selection, to a traveling mode in which the pace of the electric power consumption of the battery is slow, among the traveling modes. Moreover, the vehicle control may be performed such that when (i) a vehicle includes only an engine as the prime mover, (ii) the selection disabling condition is satisfied due to the shortage of fuel, and (iii) the switching condition is satisfied, the traveling mode is switched, regardless of the user's selection, to a traveling mode in which the fuel consumption amount is small, among the traveling modes. The above type of the engine and the above type of the motor are merely examples, and existing structures are applicable.

Moreover, the above embodiment has described an example in which the vehicle 1 is a straddled vehicle as shown in FIG. 1. However, the above embodiment is not limited to this. According to the present disclosure, the traveling mode is not switched until the switching condition is satisfied. Therefore, the deterioration of the driving feeling by the unintentional switching of the traveling mode is suppressed, and this is suitable for the straddled vehicle whose traveling feeling is easily influenced. However, the vehicle control of the present disclosure is applicable to the other moving machines. For example, the vehicle control of the present disclosure is applicable to four-wheeled passenger cars. Since the unintentional switching of the traveling mode is suppressed even in the four-wheeled passenger car, the deterioration of the driving feeling of the passenger car is suppressed.

Moreover, the above embodiment has described that examples of the selection disabling condition include a condition that the battery remaining amount has become less than a predetermined value, a condition that the abnormality of the engine has been detected, and a condition that the abnormality of the start of the engine has been detected. However, the above embodiment is not limited to these. The selection disabling condition may be another condition. For example, the selection disabling condition may be a condition that the output of the engine or the drive motor has significantly decreased. Moreover, the above embodiment has described that examples of the switching condition include a condition that the vehicle is in a stop state for a predetermined period of time and a condition that the acceleration requested amount is not more than a predetermined value. However, the above embodiment is not limited to these. The switching condition may be another condition. For example, the switching condition may be a condition that the driving power transmitted to the driving wheel is not more than a predetermined value or a condition that the vehicle is in a stop state even for a moment.

When the selection disabling condition includes conditions, and at least one of the conditions is satisfied, it may be determined that the selection disabling condition has been satisfied. Or, when some or all of the conditions are satisfied, it may be determined that the selection disabling condition has been satisfied.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The foregoing has described the embodiment as an example of the technology disclosed in the present application. However, the technology in the present disclosure is not limited to this and is applicable to embodiments in which modifications, replacements, additions, omissions, and the like have been suitably made. Moreover, a new embodiment may be prepared by combining the components described in the above embodiment. For example, some of components or methods in one embodiment may be applied to another embodiment. Some components in an embodiment may be separated from the other components in the embodiment and arbitrarily extracted. Furthermore, the components shown in the attached drawings and the detailed explanations include not only components essential to solve the problems but also components for exemplifying the above technology and not essential to solve the problems.

The following aspects disclose preferred embodiments.

First Aspect

A vehicle including:
- a driving wheel;
- at least one prime mover that generates driving power to be transmitted to the driving wheel;
- a user interface that receives user's selection of a first traveling mode or a second traveling mode; and
- processing circuitry configured to control the prime mover in accordance with the selected traveling mode, wherein:
  - when a selection disabling condition indicating a predetermined vehicle state is satisfied, the processing circuitry disables selection of the first traveling mode which is performed by the user's selection;
  - when the selection disabling condition is not satisfied, the processing circuitry enables the selection of the first traveling mode which is performed by the user's selection;
  - when the selection disabling condition is satisfied while the vehicle is traveling in the first traveling mode, the processing circuitry continues the first traveling mode until a switching condition indicating a predetermined vehicle state is satisfied; and when the selection disabling condition is satisfied while the vehicle is traveling in the first traveling mode, and the switching condition is satisfied, the processing circuitry switches the traveling mode to the second traveling mode regardless of the user's selection.

Second Aspect

The vehicle according to the first aspect, wherein:
the at least one prime mover comprises prime movers;
the first traveling mode is a traveling mode that mainly uses a first prime mover that is one of the prime movers;
the second traveling mode is a traveling mode that mainly uses a second prime mover that is one of the prime movers; and
the selection disabling condition includes a condition that a state of the first prime mover or a state of a first energy source that supplies energy to the first prime mover is outside a predetermined normal range.

Third Aspect

The vehicle according to the first or second aspect, wherein the switching condition includes a condition that the driving power transmitted from the at least one prime mover to the driving wheel is not more than a predetermined value.

Fourth Aspect

The vehicle according to any one of the first to third aspects, wherein the switching condition includes a condition that the vehicle is in a stop state.

Fifth Aspect

The vehicle according to any one of the first to fourth aspects, wherein the switching condition includes a condition that the vehicle is in a stop state for a predetermined period of time.

Sixth Aspect

The vehicle according to any one of the first to fifth aspects, further including an informer, wherein when the selection disabling condition is not satisfied while the vehicle is traveling in the second traveling mode, the processing circuitry cancels the disablement of the selection of the first traveling mode and informs the user by the informer of information indicating that the disablement of the selection of the first traveling mode has been canceled.

Seventh Aspect

The vehicle according to any one of the first to sixth aspects, wherein:
the at least one prime mover includes prime movers;
the first traveling mode is a traveling mode that mainly uses a first prime mover that is one of the prime movers;
the second traveling mode is a traveling mode that mainly uses a second prime mover that is one of the prime movers;
the selection disabling condition includes a condition that a state of the first prime mover or a state of a first energy source that supplies energy to the first prime mover is outside a predetermined normal range; and
the selection disabling condition includes a condition that an energy remaining amount of the first energy source is less than a threshold.

Eighth Aspect

The vehicle according to any one of the first to seventh aspects, wherein:
the at least one prime mover includes prime movers;
the first traveling mode is a traveling mode that mainly uses a first prime mover that is one of the prime movers;
the second traveling mode is a traveling mode that mainly uses a second prime mover that is one of the prime movers;
the selection disabling condition includes a condition that a state of the first prime mover or a state of a first energy source that supplies energy to the first prime mover is outside a predetermined normal range; and
the selection disabling condition includes a condition that a temperature of a portion related to the first prime mover or the first energy source necessary for operation of the first traveling mode is outside a predetermined range.

Ninth Aspect

The vehicle according to any one of the first to eighth aspects, wherein the selection disabling condition includes a condition that an abnormality of a portion related to the prime mover or an energy source necessary for operation of the first traveling mode has been detected.

Tenth Aspect

The vehicle according to any one of the first to ninth aspects, wherein:
the at least one prime mover includes an internal combustion engine;
the selection disabling condition includes a condition that an abnormality of start of the internal combustion engine has been detected; and
the switching condition includes a condition that an acceleration requested amount of the user is not more than a threshold.

Eleventh Aspect

The vehicle according to the tenth aspect, wherein the selection disabling condition includes a condition that the abnormality of the start has occurred at the time of the switching to the first traveling mode in the past.

Twelfth Aspect

A method of controlling a hybrid vehicle including first and second prime movers that generate driving power to be transmitted to a driving wheel,
the method including:
controlling the first and second prime movers in accordance with a traveling mode that is one of a first traveling mode that mainly uses the first prime mover and a second traveling mode that mainly uses the second prime mover;
when a selection disabling condition indicating a predetermined vehicle state is satisfied, disabling selection of the first traveling mode which is performed by user's selection;
when the selection disabling condition is not satisfied, enabling the selection of the first traveling mode which is performed by the user's selection;
when the selection disabling condition is satisfied while the vehicle is traveling in the first traveling mode, continuing the first traveling mode; and
when the selection disabling condition is satisfied while the vehicle is traveling in the first traveling mode, and a switching condition indicating a predetermined vehicle state is satisfied, switching the traveling mode to the second traveling mode regardless of the user's selection.

Thirteenth Aspect

A vehicle including:
a driving wheel;
at least one prime mover that generates driving power to be transmitted to the driving wheel;
a user interface that receives user's selection of a first traveling mode or a second traveling mode; and processing circuitry configured to control the prime mover in accordance with the selected traveling mode, wherein:

when an abnormality condition indicating a predetermined vehicle state is satisfied while the vehicle is traveling in the first traveling mode, the processing circuitry continues the first traveling mode until a switching condition indicating a predetermined vehicle state is satisfied;

when the abnormality condition is satisfied while the vehicle is traveling in the first traveling mode, and the switching condition is satisfied, the processing circuitry switches the traveling mode to the second traveling mode regardless of the user's selection; and the second traveling mode is a traveling mode in which the satisfaction of the abnormality condition is avoidable.

What is claimed is:

1. A vehicle comprising:
a driving wheel;
at least one prime mover that generates driving power to be transmitted to the driving wheel;
a user interface that receives user's selection of a first traveling mode or a second traveling mode; and
processing circuitry configured to control the prime mover in accordance with the selected traveling mode, wherein:
when a selection disabling condition indicating a predetermined vehicle state is satisfied, the processing circuitry disables selection of the first traveling mode which is performed by the user's selection;
when the selection disabling condition is not satisfied, the processing circuitry enables the selection of the first traveling mode which is performed by the user's selection;
when the selection disabling condition is satisfied while the vehicle is traveling in the first traveling mode, the processing circuitry continues the first traveling mode until a switching condition indicating a predetermined vehicle state is satisfied; and
when the selection disabling condition is satisfied while the vehicle is traveling in the first traveling mode, and the switching condition is satisfied, the processing circuitry switches the traveling mode to the second traveling mode regardless of the user's selection.

2. The vehicle according to claim 1, wherein:
the at least one prime mover comprises prime movers;
the first traveling mode is a traveling mode that mainly uses a first prime mover that is one of the prime movers;
the second traveling mode is a traveling mode that mainly uses a second prime mover that is one of the prime movers; and
the selection disabling condition includes a condition that a state of the first prime mover or a state of a first energy source that supplies energy to the first prime mover is outside a predetermined normal range.

3. The vehicle according to claim 1, wherein the switching condition includes a condition that the driving power transmitted from the at least one prime mover to the driving wheel is not more than a predetermined value.

4. The vehicle according to claim 1, wherein the switching condition includes a condition that the vehicle is in a stop state.

5. The vehicle according to claim 1, wherein the switching condition includes a condition that the vehicle is in a stop state for a predetermined period of time.

6. The vehicle according to claim 1, further comprising an informer, wherein when the selection disabling condition is not satisfied while the vehicle is traveling in the second traveling mode, the processing circuitry cancels the disablement of the selection of the first traveling mode and informs the user by the informer of information indicating that the disablement of the selection of the first traveling mode has been canceled.

7. The vehicle according to claim 1, wherein:
the at least one prime mover includes prime movers;
the first traveling mode is a traveling mode that mainly uses a first prime mover that is one of the prime movers;
the second traveling mode is a traveling mode that mainly uses a second prime mover that is one of the prime movers;
the selection disabling condition includes a condition that a state of the first prime mover or a state of a first energy source that supplies energy to the first prime mover is outside a predetermined normal range; and
the selection disabling condition includes a condition that an energy remaining amount of the first energy source is less than a threshold.

8. The vehicle according to claim 1, wherein:
the at least one prime mover includes prime movers;
the first traveling mode is a traveling mode that mainly uses a first prime mover that is one of the prime movers;
the second traveling mode is a traveling mode that mainly uses a second prime mover that is one of the prime movers;
the selection disabling condition includes a condition that a state of the first prime mover or a state of a first energy source that supplies energy to the first prime mover is outside a predetermined normal range; and
the selection disabling condition includes a condition that a temperature of a portion related to the first prime mover or the first energy source necessary for operation of the first traveling mode is outside a predetermined range.

9. The vehicle according to claim 1, wherein the selection disabling condition includes a condition that an abnormality of a portion related to the prime mover or an energy source necessary for operation of the first traveling mode has been detected.

10. The vehicle according to claim 1, wherein:
the at least one prime mover includes an internal combustion engine;
the selection disabling condition includes a condition that an abnormality of start of the internal combustion engine has been detected; and
the switching condition includes a condition that an acceleration requested amount of the user is not more than a threshold.

11. The vehicle according to claim 10, wherein the selection disabling condition includes a condition that the abnormality of the start has occurred at the time of the switching to the first traveling mode in the past.

12. A method of controlling a hybrid vehicle including first and second prime movers that generate driving power to be transmitted to a driving wheel,
the method comprising:
controlling the first and second prime movers in accordance with a traveling mode that is one of a first traveling mode that mainly uses the first prime mover and a second traveling mode that mainly uses the second prime mover;

when a selection disabling condition indicating a predetermined vehicle state is satisfied, disabling selection of the first traveling mode which is performed by user's selection;

when the selection disabling condition is not satisfied, enabling the selection of the first traveling mode which is performed by the user's selection;

when the selection disabling condition is satisfied while the vehicle is traveling in the first traveling mode, continuing the first traveling mode; and when the selection disabling condition is satisfied while the vehicle is traveling in the first traveling mode, and a switching condition indicating a predetermined vehicle state is satisfied, switching the traveling mode to the second traveling mode regardless of the user's selection.

13. A vehicle comprising:

a driving wheel;

at least one prime mover that generates driving power to be transmitted to the driving wheel;

a user interface that receives user's selection of a first traveling mode or a second traveling mode; and processing circuitry configured to control the prime mover in accordance with the selected traveling mode, wherein:

when an abnormality condition indicating a predetermined vehicle state is satisfied while the vehicle is traveling in the first traveling mode, the processing circuitry continues the first traveling mode until a switching condition indicating a predetermined vehicle state is satisfied;

when the abnormality condition is satisfied while the vehicle is traveling in the first traveling mode, and the switching condition is satisfied, the processing circuitry switches the traveling mode to the second traveling mode regardless of the user's selection; and the second traveling mode is a traveling mode in which the satisfaction of the abnormality condition is avoidable.

* * * * *